(12) United States Patent
Fischer et al.

(10) Patent No.: US 8,676,214 B2
(45) Date of Patent: Mar. 18, 2014

(54) BACKFIRE DISTRIBUTED ANTENNA SYSTEM (DAS) WITH DELAYED TRANSPORT

(75) Inventors: Larry G. Fischer, Waseca, MN (US); Morten Tolstrup, Dronninglund (DK)

(73) Assignee: ADC Telecommunications, Inc., Shakopee, MN (US)

( * ) Notice: Subject to any disclaimer, the term of this patent is extended or adjusted under 35 U.S.C. 154(b) by 803 days.

(21) Appl. No.: 12/702,784

(22) Filed: Feb. 9, 2010

(65) Prior Publication Data

US 2010/0202356 A1 Aug. 12, 2010

Related U.S. Application Data

(63) Continuation-in-part of application No. 12/370,474, filed on Feb. 12, 2009, now abandoned.

(51) Int. Cl.
*H04W 36/00* (2009.01)

(52) U.S. Cl.
USPC .......................................................... 455/442

(58) Field of Classification Search
USPC ............. 455/422.1, 424, 425, 442, 448, 11.1, 455/16, 19, 25, 41.1, 41.2, 506, 524, 63.4, 455/562.1
See application file for complete search history.

(56) References Cited

U.S. PATENT DOCUMENTS

| | | |
|---|---|---|
| 3,594,802 A | 7/1971 | Koob |
| 4,183,054 A | 1/1980 | Patisaul et al. |
| 4,475,246 A | 10/1984 | Batlivala et al. |
| 4,611,323 A | 9/1986 | Hessenmüller |
| 4,628,501 A | 12/1986 | Loscoe |
| 4,654,843 A | 3/1987 | Roza et al. |
| 4,691,292 A | 9/1987 | Rothweiler |
| 4,932,049 A | 6/1990 | Lee |
| 4,999,831 A | 3/1991 | Grace |
| 5,014,344 A | 5/1991 | Goldberg |
| 5,067,147 A | 11/1991 | Lee |
| 5,127,101 A | 6/1992 | Rose, Jr. |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 5,347,535 A | 9/1994 | Karasawa et al. |
| 5,404,570 A * | 4/1995 | Charas et al. .................. 455/22 |

(Continued)

FOREIGN PATENT DOCUMENTS

| | | |
|---|---|---|
| EP | 0391597 | 10/1990 |
| GB | 2237706 | 5/1991 |

(Continued)

OTHER PUBLICATIONS

Chris Harvey, Cordless Communications Utilising Radio Over Fibre Techniques for the Local Loop, IEEE ICC 1991, CH2984-3/91/0000-1171, pp. 1172-1174.*

(Continued)

*Primary Examiner* — Nathan Mitchell
(74) *Attorney, Agent, or Firm* — Fogg & Powers LLC

(57) ABSTRACT

A distributed antenna system (DAS) is provided, comprising a host unit and a plurality of remote placed to define a common coverage area. Each of the plurality of remote units is communicatively coupled to the host unit, points at least partially towards the common coverage area, and simulcasts data from the host unit.

64 Claims, 15 Drawing Sheets

(56) References Cited

U.S. PATENT DOCUMENTS

| | | |
|---|---|---|
| 5,422,908 A | 6/1995 | Schilling |
| 5,504,936 A | 4/1996 | Lee |
| 5,513,176 A | 4/1996 | Dean et al. |
| 5,533,011 A * | 7/1996 | Dean et al. ............... 370/342 |
| 5,627,879 A | 5/1997 | Russell et al. |
| 5,678,186 A | 10/1997 | Lee |
| 5,758,287 A | 5/1998 | Lee et al. |
| 5,781,541 A * | 7/1998 | Schneider ............... 370/335 |
| 5,802,173 A | 9/1998 | Hamilton-Piercy et al. |
| 5,809,422 A | 9/1998 | Raleigh et al. |
| 5,852,651 A | 12/1998 | Fischer et al. |
| 5,890,066 A | 3/1999 | Levin |
| 5,918,154 A | 6/1999 | Beasley |
| 5,953,659 A | 9/1999 | Kotzin et al. |
| 5,983,118 A | 11/1999 | Lee |
| 6,067,290 A | 5/2000 | Paulraj et al. |
| 6,122,266 A | 9/2000 | Lynch |
| 6,122,529 A | 9/2000 | Sabat, Jr. et al. |
| 6,125,109 A | 9/2000 | Fuerter |
| 6,128,496 A | 10/2000 | Scheinert |
| 6,195,567 B1 | 2/2001 | Lee |
| 6,198,925 B1 | 3/2001 | Lee |
| RE37,820 E | 8/2002 | Scheinert |
| 6,434,406 B2 | 8/2002 | Lee |
| 6,448,930 B1 | 9/2002 | Judd |
| 6,459,900 B1 | 10/2002 | Scheinert |
| 6,580,912 B2 | 6/2003 | Leung et al. |
| 6,597,325 B2 | 7/2003 | Judd et al. |
| 6,611,511 B1 | 8/2003 | Schulz |
| 6,748,216 B1 | 6/2004 | Lee |
| 6,748,218 B1 | 6/2004 | Johnson et al. |
| 7,031,755 B2 | 4/2006 | Li et al. |
| 7,039,399 B2 | 5/2006 | Fischer |
| 7,072,365 B1 | 7/2006 | Ansley |
| 7,231,214 B2 | 6/2007 | Garrison |
| 2004/0203703 A1 * | 10/2004 | Fischer ............... 455/422.1 |
| 2009/0175214 A1 * | 7/2009 | Sfar et al. ............... 370/315 |
| 2009/0180407 A1 * | 7/2009 | Sabat et al. ............... 370/280 |

FOREIGN PATENT DOCUMENTS

| | | |
|---|---|---|
| GB | 2438898 | 12/2007 |
| KR | 950005818 | 5/1995 |
| WO | 9115927 | 10/1991 |
| WO | 9944308 | 9/1999 |
| WO | 0182642 | 11/2001 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

Swindlehurst, A. Lee, "Identifiability Issues for Rotationally Invariant Arrays", "Conference Record of the Twenty-Fifth Asilomar Conference on Volume", Nov. 4-6, 1991, pp. 312-316, vol. 1, Publisher: IEEE.

Vaughan, Mark J. et al., "InP-Based 28 GHz Integrated Antennas for Point-to-Multipoint Distribution", "IEEE/Cornell Conference on Advanced Concepts in Volume", Aug. 7-9, 1995, pp. 75-84, Publisher: IEEE.

International Searching Authority, "International Search Report", Aug. 20, 2010, Published in: WO.

State Intellectual Property Office, P.R. China, "First Office Action", "from Foreign Counterpart of U.S. Appl. No. 12/702,784", Sep. 27, 2013, pp. 1-18, Published in: CN.

\* cited by examiner

BACKFIRE DISTRIBUTED ANTENNA SYSTEM (DAS) WITH DELAYED TRANSPORT

CROSS-REFERENCE TO RELATED APPLICATIONS

This application is a continuation-in-part of, and claims priority to, U.S. application Ser. No. 12/370,474 entitled "DISTRIBUTED ANTENNA SYSTEM (DAS) WITH DELAYED TRANSPORT TO PAIRED ANTENNAS" filed on Feb. 12, 2009, which is herein incorporated by reference.

BACKGROUND

With approximately 80% of voice mobile cellular users located indoors, cellular networks and systems such as Universal Mobile Telecommunications System (UMTS) aim to provide consistent indoor coverage. Around 95% of data mobile cellular users reside inside buildings, typically using High-Speed Downlink Packet Access (HSDPA). HSDPA is a high speed data service that can be deployed on top of the UMTS layer. HSDPA performance inside buildings especially poses a coverage challenge to traditional strategies.

Buildings create high penetration losses, high power load per user, and drain the capacity of the UMTS. Inside buildings there is very often a lack of single cell dominance, resulting in larger soft handover zones. Due mainly to the lack of isolation between several serving cells, HSDPA performance is limited. UMTS/HSDPA is a noise sensitive system, thus HSDPA performance, namely data speed, is dependent on the signal to noise ratio (SNR) and the signal to interference ratio (SIR). Improving HSDPA performance depends on the geometry factor, G, given as:

$$G = \frac{\text{Received Signal}}{\text{Thermal Noise} + \text{Interference}}$$

Interference results from network traffic and from other cells. A good geometry factor which will produce higher speeds requires good cell isolation between the cells. There are no soft handovers in HSDPA and the cells operate on the same channel. Thus, neighbor cells are potential noise sources to the HSDPA user.

Traditionally, microcells are often deployed in high use areas in city centers. Where a macrocell does not sufficiently cover an intended area, a microcell is deployed to provide coverage to that area. Microcells deployed in high traffic urban areas typically provide good deep indoor coverage and boost capacity by a low frequency and scrambling code reuse factor. Each microcell antenna radiates a separate cell with typical inter-site distances of about 300-500 meters. However, standard deployment gives poor isolation between neighboring cells. Soft handover zones typically cover 30-40% of the area in a traditional microcell roll-out. These soft handover zones load the backhaul and impact the capacity of the network. Also, the SNR between neighboring HSDPA cells will degrade data throughput in overlapping areas. Other microcell difficulties include dropped calls, high power load on the UMTS, and a high production cost for the operator.

Another communication service protocol is Orthogonal Frequency-Division Multiple Access (OFDMA) which is a digital modulation scheme where multiple access is achieved by assigning subsets of subcarriers to individual users, allowing simultaneous low data rate transmission from several users. Other protocols which may be used include, but are not limited to, Worldwide Interoperability for Microwave Access (WiMAX) and Long Term Evolution (LTE). These protocols can be used with multiple-input multiple-output (MIMO) networks. In typical MIMO networks, multiple antennas are closely spaced to each other. However, consistent signal coverage is not achieved in a closely spaced MIMO network, resulting in more frequent soft handovers (except for WiMAX and LTE systems which do not have soft handovers), lower average data rate, lower battery quality, and lower voice quality.

SUMMARY

Embodiments provide a distributed antenna system (DAS), comprising a host unit and a plurality of remote units placed to define a common coverage area. Each remote unit is communicatively coupled to the host unit, points at least partially towards the coverage area, and simulcasts data from the host unit.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
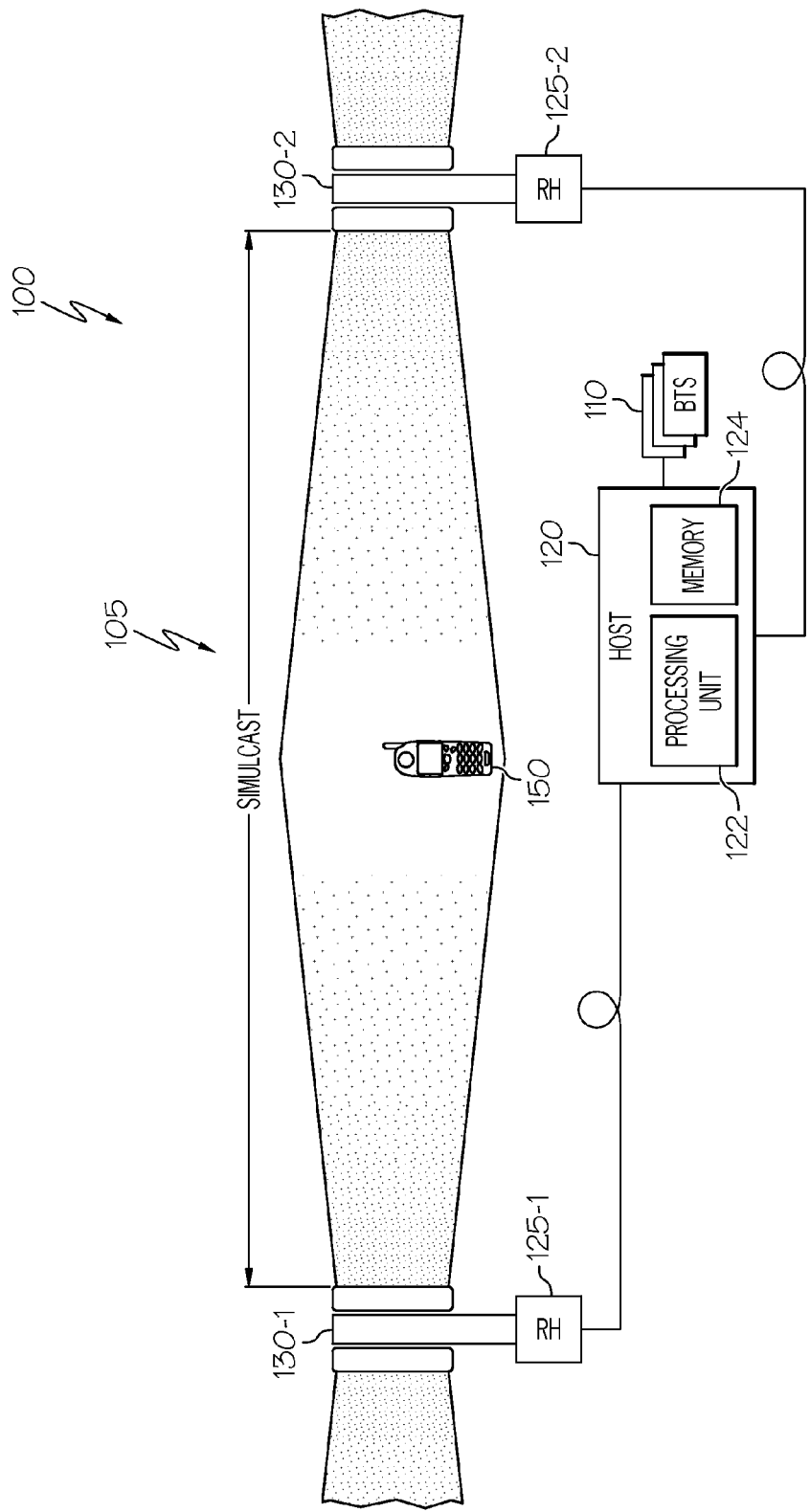
FIG. 1 is a block diagram of one embodiment of a backfire distributed antenna system (DAS) with two remote units connected to a base station transceiver.

FIG. 1 is a block diagram of one embodiment of a backfire distributed antenna system (DAS) 100 with two remote units 125 connected to a base transceiver station 110. A distributed antenna system is a network of spatially separated remote units communicatively coupled to a common source via a transport medium that provides wireless service within a geographic area or structure (also referred to herein as a cell or a coverage area). The transport medium can be coaxial cable or fiber optic connections, twisted pair, free space optics, cable, mmWave, radio frequency (RF) links, or the like. In a DAS, transmitted power is divided among several antennas in distributed locations so as to provide a large coverage area using less transmitted power than would be required by a single antenna.

The DAS system 100 comprises a host 120 which interfaces with a base transceiver station (BTS) 110. The BTS 110 is associated with one or more service providers that supply communication services for mobile subscribers. Communication services which use the BTS 110 can use protocols such as Wideband Code Division Multiple Access (WCDMA) or Orthogonal Frequency-Division Multiple Access (OFDMA). OFDMA is a digital modulation scheme where multiple access is achieved by assigning subsets of subcarriers to individual users, allowing simultaneous low data rate transmission from several users, or allowing aggregation of the subcarriers into high speed data rates for fewer users. Other protocols that the BTS 110 may provide include, but are not limited to, Worldwide Interoperability for Microwave Access (WiMAX) and Long Term Evolution (LTE). The host 120 is operable to carry signals from any protocol the BTS 110 provides.

The host 120 is in turn communicatively coupled (via coaxial cable, fiber optic connections, RF links, etc.) to one or more remote units 125-1 and 125-2 (referred to herein as remote units 125). The first remote unit 125-1 includes a first antenna 130-1 and the second remote unit 125-2 includes a second antenna 130-2 (referred to herein as antennas 130). A remote unit 125 houses an electronic and antenna system 130 used for wirelessly transmitting and receiving voice and/or data communications for subscribers of the service providers. One example of a remote unit is the radio head (RH) made by ADC Telecommunications, Inc. The Flexwave Prism made by ADC Telecommunications, Inc. may also be used. Distributed Antenna Systems are used with cellular systems to place remote units at the most desirable locations while keeping the baseband resources (such as the host 120) at a central location.

The DAS 100 can employ multiple-input, multiple-output (MIMO) techniques. A MIMO wireless network is a communication system with multiple antennas at both transmitter and receiver ends of a communication link. MIMO can be used with service provider technologies such as WCDMA, Evolved High Speed Packet Access (HSPA+), WiMAX, and LTE. There are various forms of MIMO that can be used, including Space Time Coding (STC) and Spatial Multiplexing (SM).

Space Time Coding is a technique used to transmit multiple copies of a data stream across a plurality of antennas and to exploit the various received versions of the data to improve reliability and reach. STC combines all the copies of the received signal in a way to maximize the Signal to Noise Ratio (SNR). One encoding method used in STC is the Alamouti method, which is a type of channel coding utilizing space-time block codes. STC does not require the signal strength from each antenna to be equal. However, if one signal is much weaker than the other (for example, by 10 dB), diversity gain will not be realized. One signal will be much weaker than another in areas much further from the antenna with the weak signal than the other antenna, or if the signal is shadowed.

Spatial Multiplexing (SM) MIMO techniques involve splitting a signal into a plurality of signal streams wherein each of the plurality of signal streams is transmitted from a different transmit antenna in the same frequency band. SM doubles the bandwidth over the coverage area 105 but does not add to the range or signal gain of the coverage area 105. In regions where the coverage areas of the antennas 130 do not overlap, capacity will not be doubled. However, within the common coverage area the signals do not overlap close to one of the antennas. The signal strength is highest near one of the antennas where the capacity is already high due to the high SNR and the use of more efficient modulation. Spatial multiplexing occurs only in the overlap region because the signal strength from each antenna needs to be roughly equal. For a widely spaced backfire MIMO with two antennas, MIMO benefit is achieved using the same number of antennas as a single-input, single-output (SISO) network.

The host 120 comprises a processing unit 122 and a memory 124. The processing unit 122 is configured to transmit a signal to the remote units 125-1 and 125-2. The processing unit 122 may be located within or external to the host 120. The antennas 130-1 and 130-2 receive delayed signals due to the transmission time between the remote units 125-1 and 125-2 and the host 120, respectively. The processing unit 122 calculates the delay corresponding to the signal paths from the host unit 120 to each remote unit 125. Transmission of data from the host 120 to a remote unit 125 can be further delayed by the processor 122. Other means of delaying the transmission of data from the host 120 to a remote unit 125 includes lengthening the cable connecting the host 120 to the remote unit 125 (for example, by adding delay lines or spools of wire or fiber optic cable) or any other known method of adding delay to a signal.

The processing unit 122 can be implemented using software, firmware, hardware, or any appropriate combination thereof, as known to one of skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, a specially-designed application-specific integrated circuit (ASIC) or a field programmable gate array (FPGA). In this exemplary embodiment, processing unit 122 includes or functions with software programs, firmware or computer readable instructions for carrying out various methods, process tasks, calculations, and control functions, used in delaying and transmitting data from a host to remote units. These instructions are typically tangibly embodied on any appropriate medium used for storage of computer readable instructions or data structures. In particular, in this embodiment, the instructions are stored on the memory 124.

The memory 124 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The DAS 100 uses simulcast to transmit the signals nearly simultaneously from both antennas 130. Simulcast is often used with DAS whereby the signal from a single base station 110 is replicated in multiple DAS systems to supply RF signal transceivers where they are needed for gap filling. However, when two multicast remote units 125 on the same frequency band are placed where their signals can overlap (that is, where the coverage area for each antenna 130 overlaps), multipath interference will occur. Multipath interference is especially problematic when the signals are at approximately the same power level. Large ripples can occur with deep nulls in the passband of the frequency band. OFDMA is well suited to handle these problems, however many of the OFDMA sub-carriers may be attenuated beyond recovery and cause degradation in performance, which can be overcome by using the Alamouti STC method. With HSDPA systems, as discussed below, this problem is overcome by utilizing at least a chip delay to allow a rake receiver to resolve the multipath signals.

The geographic area which the antennas 130 transmit over is the coverage area 105. As shown in FIG. 1, the antennas 130-1 and 130-2 are placed a distance apart and create the coverage area 105. In other embodiments, the antennas 130 are placed around the periphery of an area where coverage is desired (for example, around a building, in a stadium, along a residential street, along a railway, etc.). The coverage area 105 may be inside or outside a building. The DAS antennas 130-1 and 130-2 are configured to both transmit on the same frequency band. A wireless device 150 is shown within coverage area 105 which may be used by a mobile user (for example, a person using a phone or a laptop computer). The wireless device 150 is communicating with the DAS 100 with a rake receiver, which uses several sub-receivers called fingers. Each finger decodes a multipath component of the received signal.

Typically in Distributed Antenna Systems, the signals have to be delayed such that the signals are transmitted by the antennas 130 nearly simultaneously. The signals for antennas closer to the host 120 (with respect to propagation delay) are delayed by an amount such that the signals reach those antennas at the same time as the signal reaches the furthest antenna. However, the signals may be transmitted more than a chip apart. A chip is a pulse of a direct-sequence spread spectrum (DSSS) code, the term for a segment of the modulated signal. In other words, a chip is a unit of transmission. If the signal delay is less than one chip, fading problems occur. However, if the signals are transmitted at least one chip apart, a rake receiver is capable of interpreting the delay. For example, in a two antenna system one finger of the rake receiver receives the undelayed signal and another finger receives the signal delayed by at least one chip. Because the signal is delayed by one chip, the rake receiver can disentangle the signal in the region of interference. Therefore, the rake receiver enables the DAS to use two or more copies of a signal stream if the time difference between the copies is more than one chip. In an OFDMA widely spaced MIMO backfire system, the signals do not have to be at least one chip apart. However, the signals could be variably delayed to equalize the time delay for the DAS, although a delay is not required. If a delay is used, the delay should be smaller than the OFDMA cyclic prefix (which repeats the end of a data symbol at the beginning of the data symbol).

The antennas 130 are widely spaced in a backfire configuration. In a backfire DAS configuration, the antennas point towards each other (that is, inward to the cell) instead of away from each other (away from the cell). Widely spaced transceivers are placed a greater distance apart (for example, at opposing sections of a coverage area) than typical MIMO systems which have transceivers closely spaced (that is, in the same section of a coverage area). In one embodiment of a widely spaced DAS configuration, the remote units are spaced from each other such that near each remote unit, signals from the other remote units are negligible. Having widely spaced transceivers allows the DAS to have a more consistent signal over a greater area. The backfire configuration results in an additional shadowing benefit. A wireless device 150 will have more coverage when being shadowed (for example, by a tree or wall) than with typical systems. Additionally, using MIMO with protocols such as LTE or WiMAX benefit from having a large low-correlation between the signals. Correlation between the signals is high when the antennas are closely spaced, resulting in poor MIMO performance.

For a DAS in a backfire configuration, the antennas in a pair of antennas are configured such that they are aimed at least partially towards each other. The antennas can aim directly towards each other (as shown in FIG. 1) or be offset by an angle such that any part of the antennas' transmission areas overlap. Backfiring maintains the RF power between the DAS sources at a more constant level, and backfiring on the same frequency band saturates the cell. This single cell dominance results in a more consistent signal and reduces interference between the antennas. In a backfire configuration with multiple pairs of remote units, the cells of each remote unit pair are fairly isolated from each other. The Signal to Noise and Signal to Interference Ratios are reduced due to good cell isolation. This improves the geometry factor, G, which increases overall DAS performance. Particularly, HSDPA performance is increased, especially through increased data speed.

STC and SM are well suited for the DAS antenna nodes 130 being widely spaced and in a backfire configuration. When the wireless device 150 is located near the periphery of the cell 105 (such as near one of the antennas 130), the signals are unbalanced and space time coding and spatial multiplexing are not needed as the signal is strong and without interference. However at the boundary between the DAS nodes 130 (near the center of the cell 105), the signals are at approximately equal strength. STC was designed to accommodate this condition and interference is generally not a problem. Similarly, spatial multiplexing will also work well at the boundary region because the paths the signals take will be uncorrelated, a requirement for spatial multiplexing. Near one of the antennas 130, the wireless device 150 is not likely to receive signals from the other antenna 130. However, the wireless device 150 will have good signal quality due to being near one antenna.

Figure 2A:
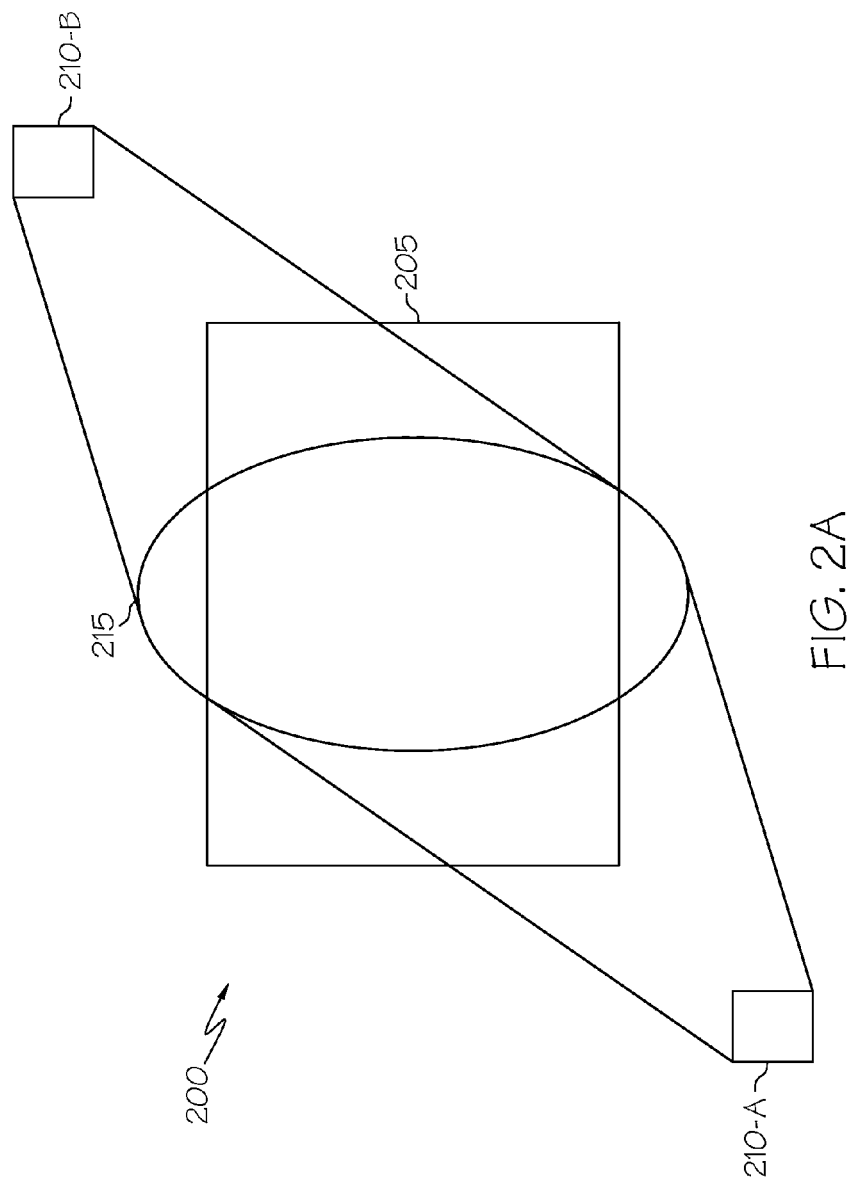
FIGS. 2A-2C are block diagrams showing configurations of embodiments of a backfire distributed antenna system around a building.
Figure 2B:
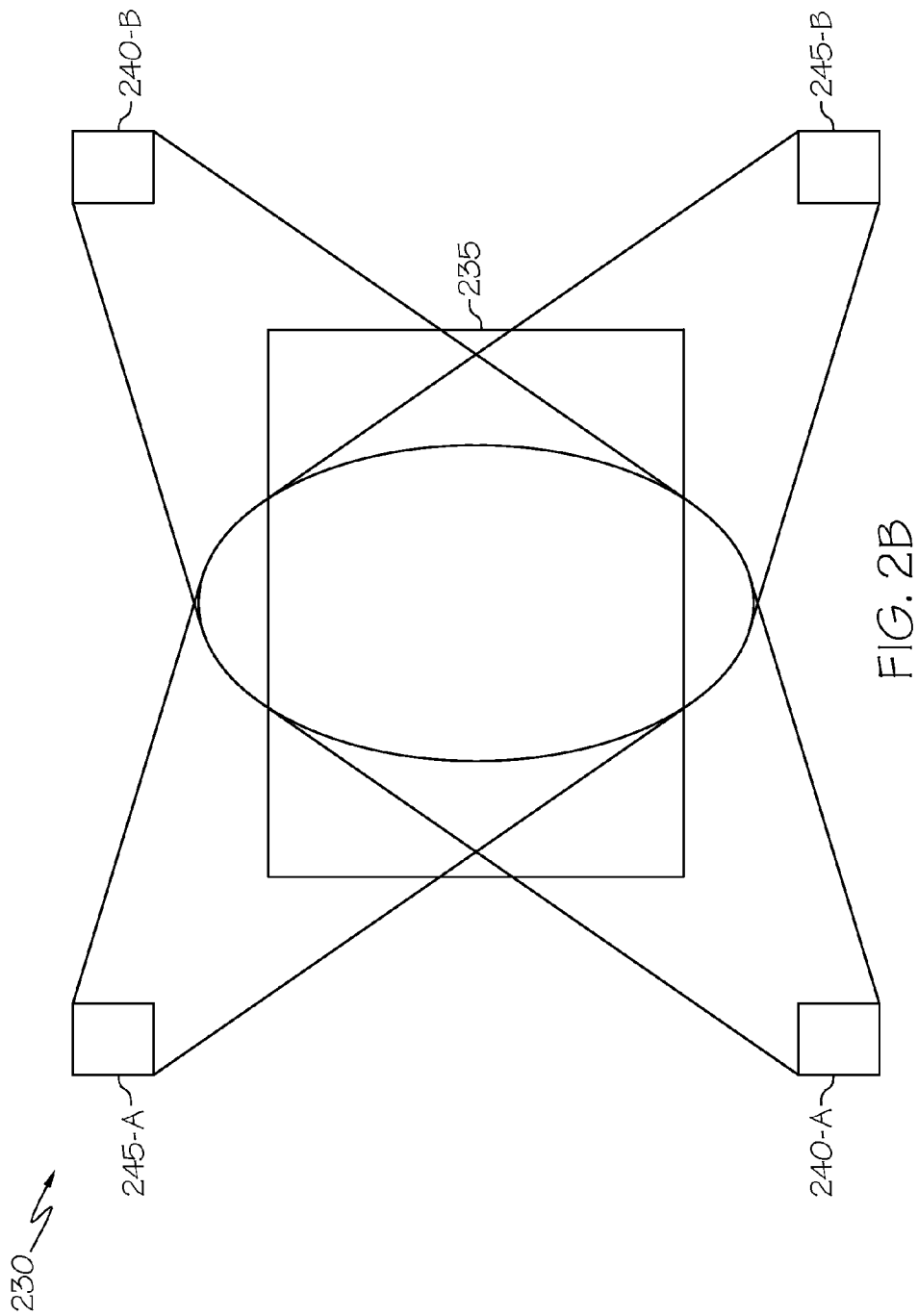
Figure 2C:
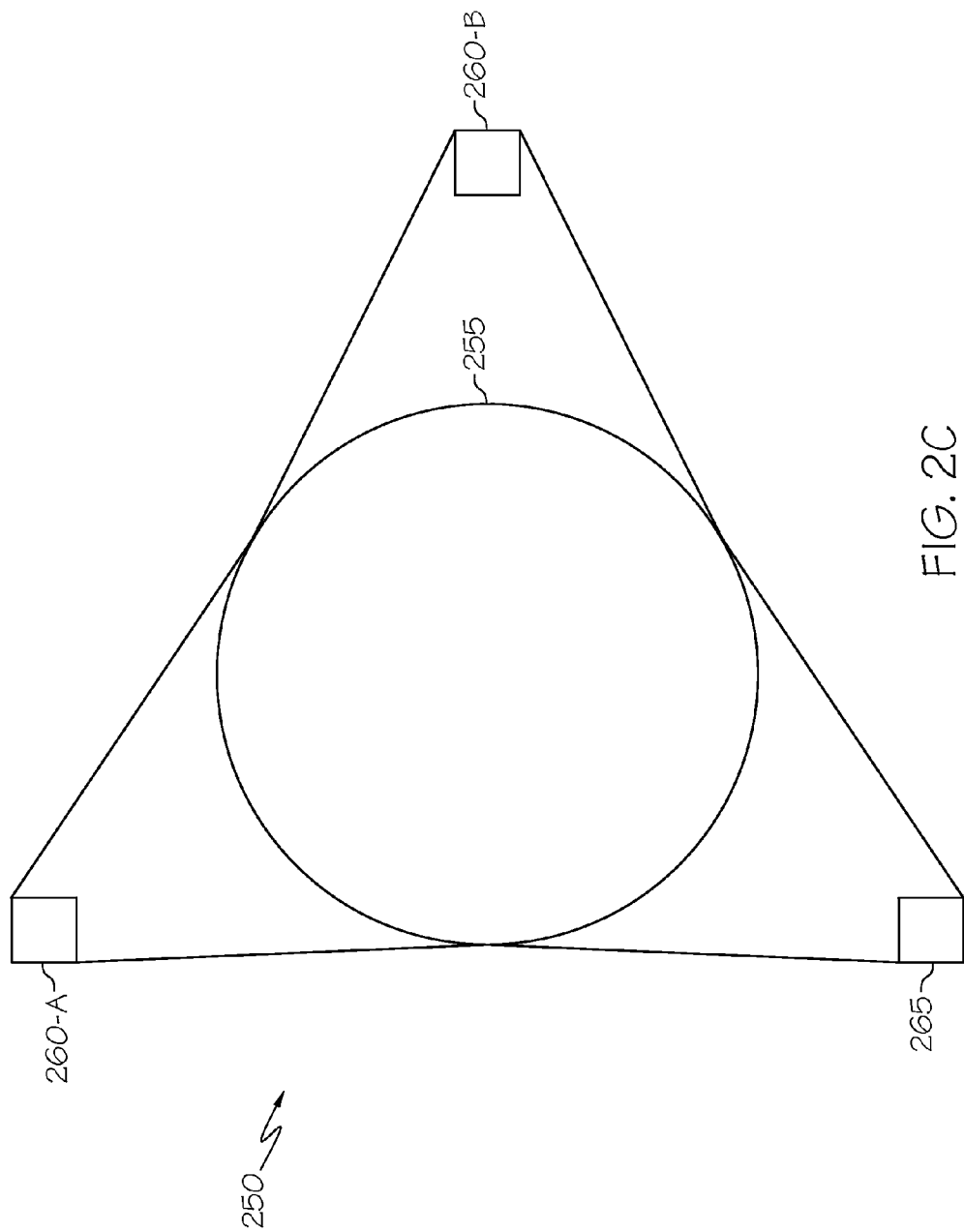

FIGS. 2A-2C are block diagrams showing configurations of embodiments of a backfire distributed antenna system around a building. FIG. 2A is a block diagram of one embodiment of a backfire DAS 200 with two transceivers 210-A and 210-B. The DAS 200 covers the building 205. An overlap region 215 is shown where the coverage of the transceivers 210 overlap. The transceivers 210-A and 210-B are on the same frequency band. In one embodiment, the DAS 200 is transmitting HSDPA. The transceivers 210 are communicatively coupled to a host (not shown) which sends signals to the transceivers 210 such that the signals transmitted by the transceivers 210 are separated in time by at least one signal chip. In alternate embodiments, the DAS 200 is a 2×2 MIMO system using either STC or SM.

The techniques described above may be combined with separate frequency bands. For example, the DAS could have four transceivers, each paired with backfiring partners to create two channel cells that have high isolation from each other and low interference. FIG. 2B is a block diagram of one embodiment of a backfire DAS 230 with four transceivers 240-A, 240-B, 245-A, and 245-B. Antennas 240-A and 240-B are on a first frequency band and are backfiring partners. Antennas 245-A and 245-B are on a second frequency band and are backfiring partners.

Alternative embodiments of a backfire DAS comprise a plurality of antennas, wherein at least one of the antennas is not paired. FIG. 2C is a block diagram of one embodiment of a backfire distributed antenna system 250 with a pair of antennas, 260-A and 260-B, and an unpaired antenna 265. The antennas 260-A and 260-B are on a first frequency band and are backfiring partners. The third antenna 265 is also on the first frequency band and the signal radiated by the third antenna 265 is delayed at least one chip apart from the antennas 260-A and 260-B. Other embodiments of distributed antenna system have any suitable number of antennas, such as, for example, four unpaired antennas, four antennas two of which are paired, or five antennas. These embodiments provide an inward facing cell structure utilizing any number of inward facing antennas to improve the coverage of the edge of the cell area. This arrangement is especially suitable for LTE because the chance of signal loss decreases through improved data throughput and distribution of subcarriers between cells.

Figure 3A:
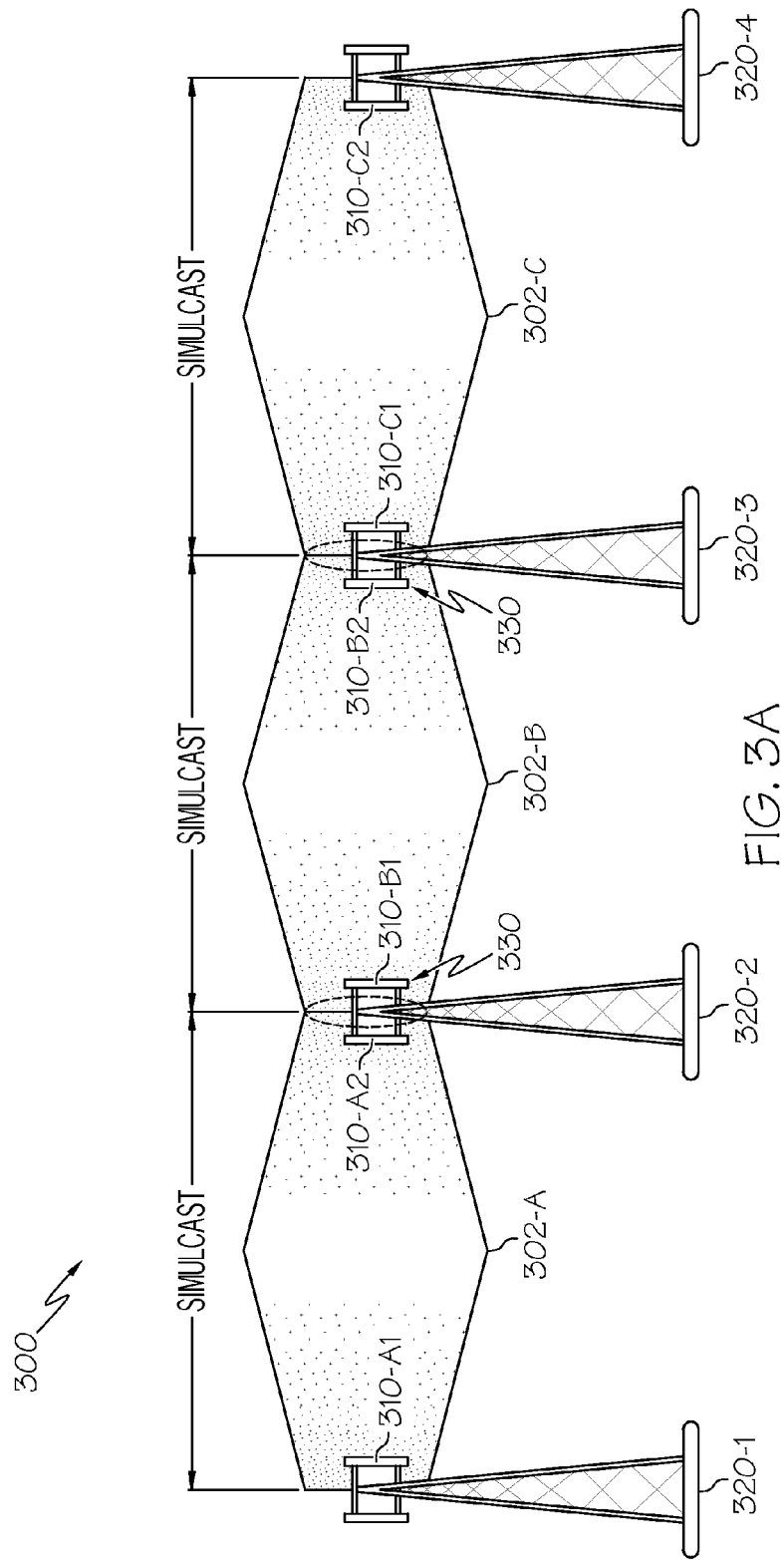
FIGS. 3A-3B are block diagrams showing configurations of embodiments of a backfire distributed antenna system along a curvilinear path.
Figure 3B:
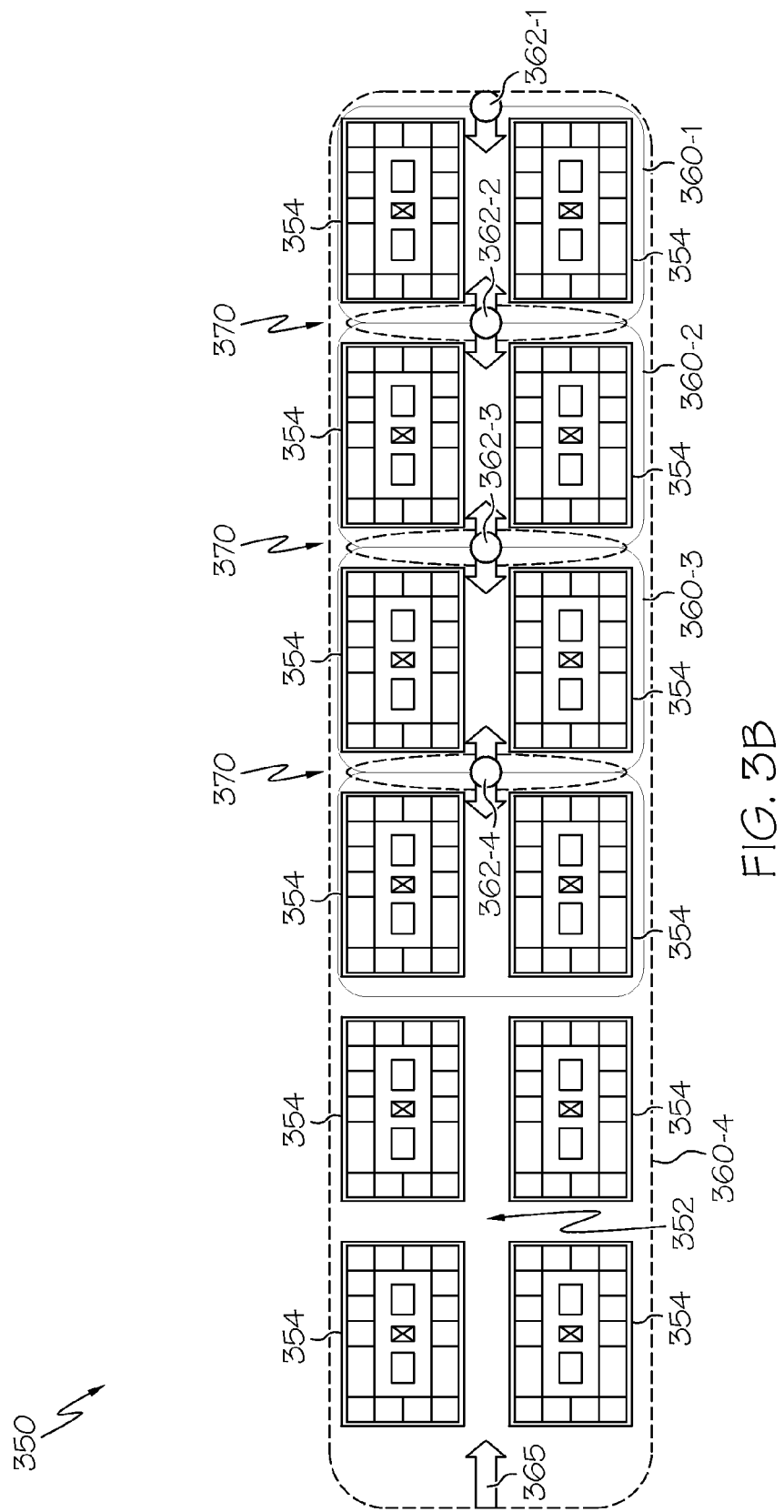

FIGS. 3A-3B are block diagrams showing configurations of embodiments of a backfire distributed antenna system along a curvilinear path. FIG. 3A is a block diagram of one embodiment of a linear backfire DAS 300. The DAS 300 may be placed along a street, highway, railway, tunnel, or the like. Three cell regions are shown, 302-A, 302-B, and 302-C (referred to herein as cells 302). Transceivers 310 are mounted back-to-back on the antenna towers 320-1 through 320-4. The tower 320-1 supports the transceiver 310-A1. The tower 320-2 supports the transceivers 310-A2 and 310-B1, and so on. Transceivers 310-A1 and 310-A2 are in a backfire configuration and are backfiring partners, as well as 310-B1 and 310-B2, and 310-C1 and 310-C2.

The cells 302 are each on a separate frequency band. In one embodiment, only adjacent cells are on separate frequency bands (for example, cell 302-A and 302-C are using a first frequency band, and cell 302-B is using a second frequency band). In another embodiment, the cells 302 are all on the same frequency band. Using DAS deployment with back-to-back mounted sector antennas may bust the isolation between the cells 302-A, 302-B, and 302-C. However, there are still handover zones at the gridlines 330 (the boundaries between the cells), but these are in limited regions directly near the antennas. The gridlines 330 are between cells 302-A and 302-B, as well as between cells 302-B and 302-C. Throughout the coverage area, the signal is much more consistent in this configuration than with traditional cells. Thus, soft handovers occur less frequently, resulting in greater capacity throughout the cell. If a user is traveling through the DAS (for example, a passenger riding a railcar), the user's device will experience greater bandwidth and less power consumption, due to greater cell isolation and reduced handovers.

FIG. 3B is a block diagram of one embodiment of a linear backfire DAS 350 along a street 352. Buildings 354 (such as offices and residences) and remote units 362-1 through 362-4 are located along the street 352. The remote units 362 are connected to a host (not shown) and comprise transceivers (not shown). The transceivers broadcast over coverage areas 360-1 through 360-4 in a backfire configuration (the arrows in FIG. 3B depict the direction of beamforming of the transceivers). The gridlines 370 between cells 360 indicate areas of signal overlap between different cells 360.

The transceiver 365 is a macro antenna. A macro antenna is directly connected to a base transceiver station. The transceiver 365 may be operating on the same frequency band as remote unit 362-4. In other embodiments, the transceiver 365 is another remote unit in the Distributed Antenna System. The cells 360 may all be on the same frequency band or on different frequency bands.

Figure 4A:
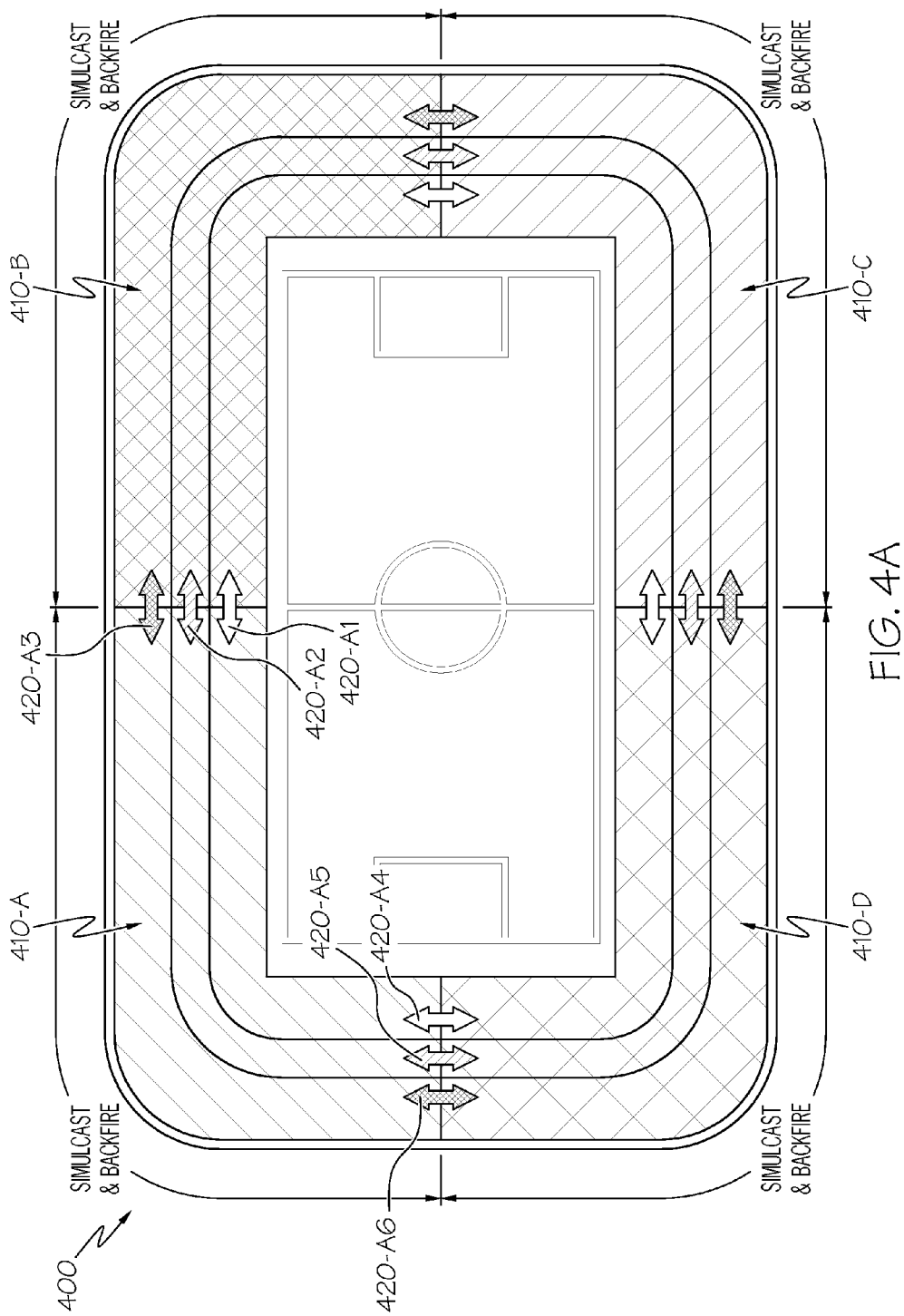
FIGS. 4A-4B are block diagrams showing configurations of embodiments of a backfire distributed antenna system in a stadium.
Figure 4B:
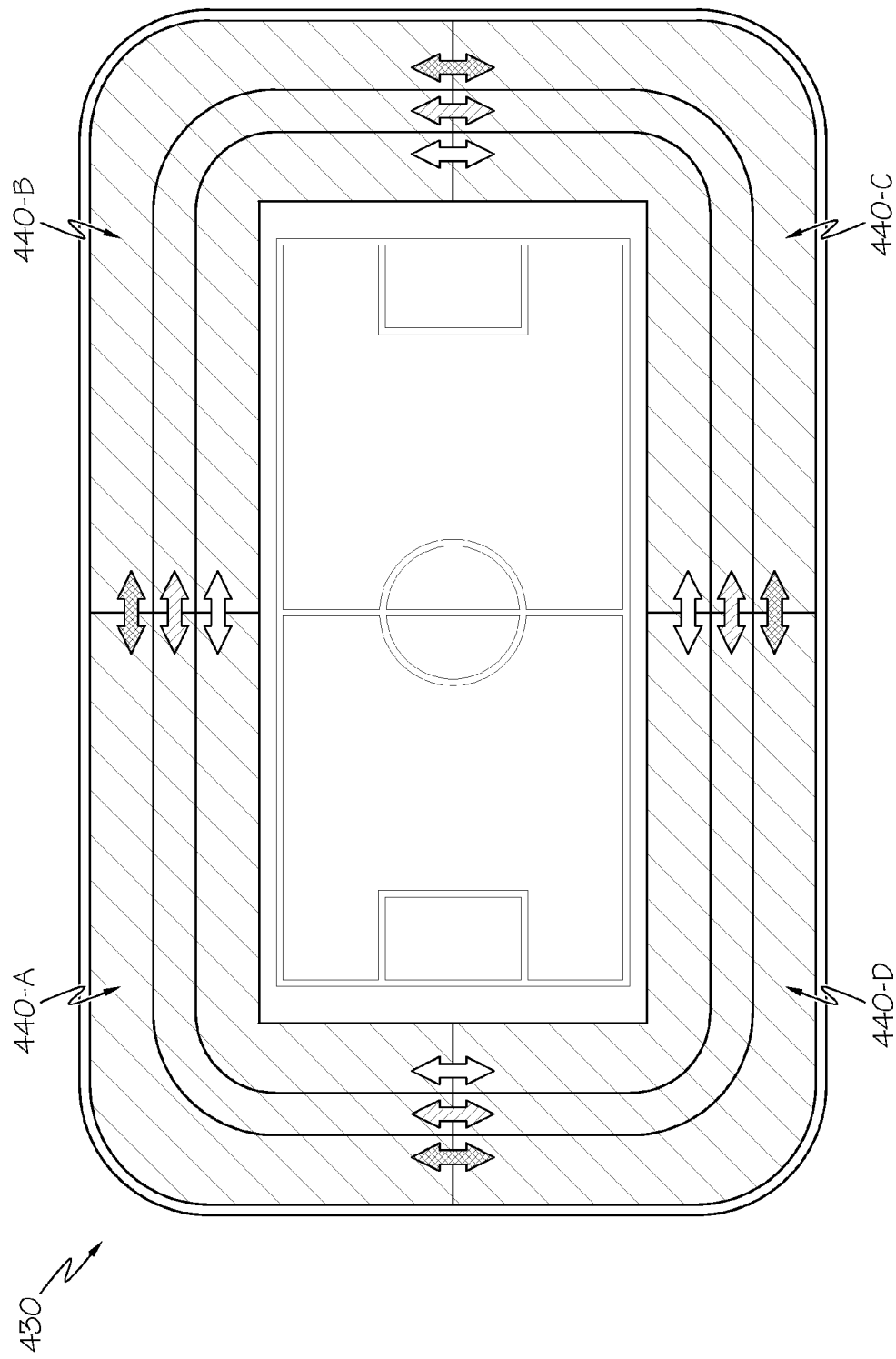

FIGS. 4A-4B are block diagrams showing configurations of embodiments of a backfire distributed antenna system in a stadium. FIG. 4A shows a stadium 400 with four cells 410-A through 410-D on distinct frequency bands. The stadium 400 has levels 1 through 3, corresponding to lower, middle, and upper decks of the stadium 400. Each cell 410 has backfired antennas 420 corresponding to each level. For example, cell 410-A has antenna 420-A1 backfired with 420-A4 on level 1, antenna 420-A2 backfired with 420-A5 on level 2, and antenna 420-A3 backfired with 420-A6 on level 3. The antenna pairs are directed perpendicular to each other; however the antenna pairs create a common coverage area.

FIG. 4B shows a stadium 430 with four cells 440-A through 440-D on the same frequency band. In other words, the same cell (frequency band) is simulcast by all the remote units in the DAS. This configuration results in the network having low capacity. Other cell configurations and frequency bands are contemplated.

Figure 5:
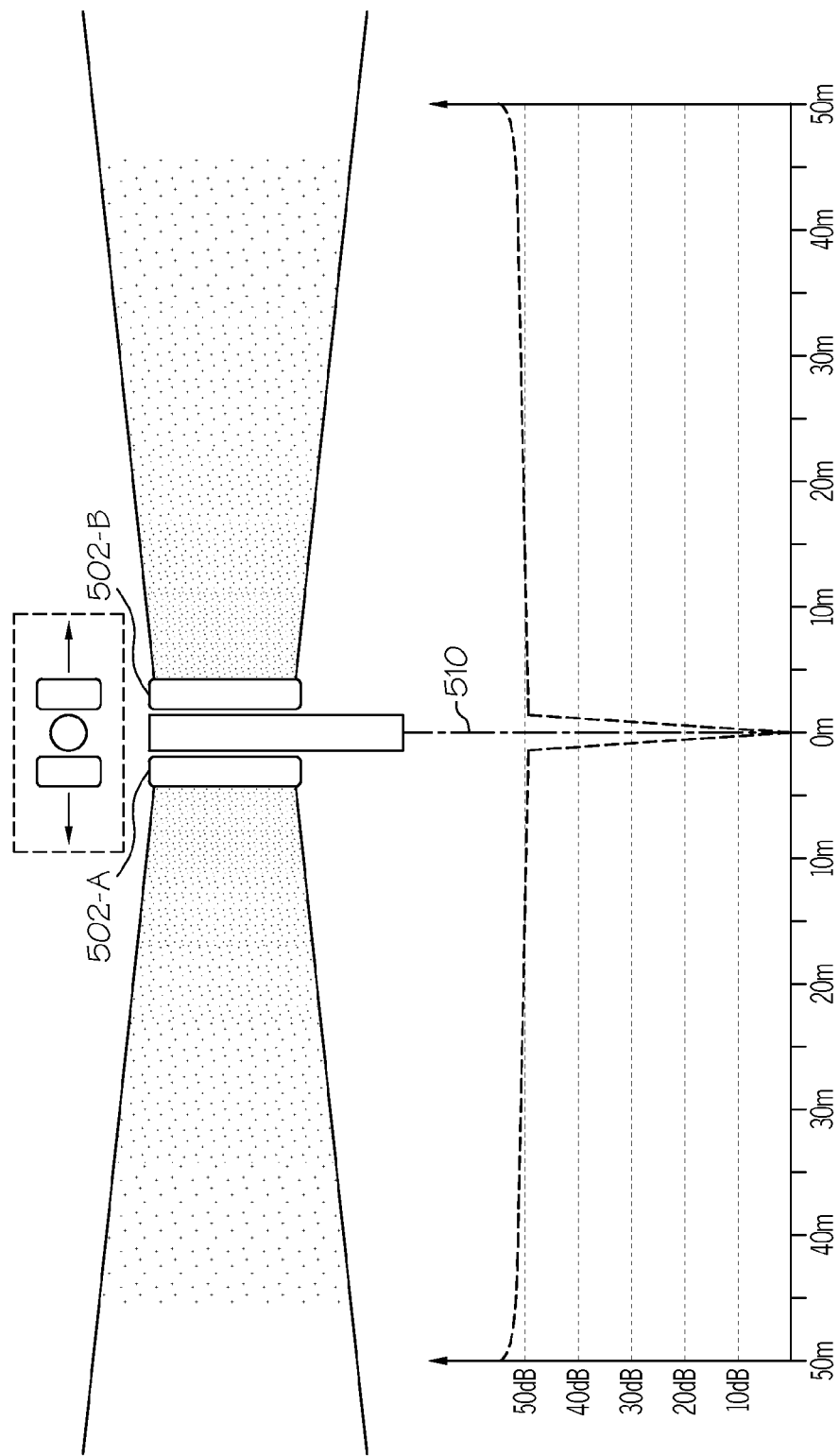
FIG. 5 is a graph of isolation between two distributed antennas mounted back-to-back.

FIG. 5 is a graph of isolation between two distributed antennas 502 mounted back-to-back. There is good isolation between the two cells except for along the gridline 510, corresponding to the area between the antennas 502-A and 502-B.

Figure 6:
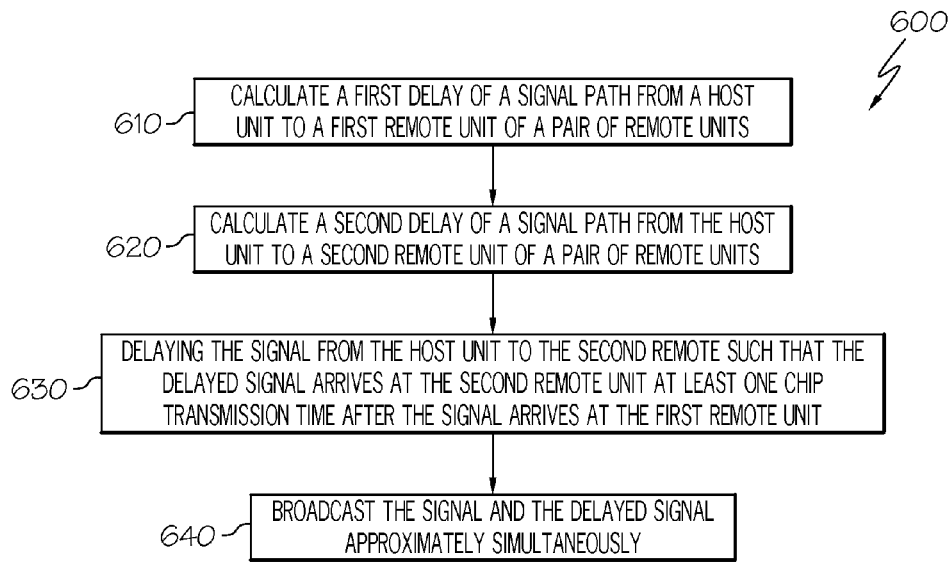
FIG. 6-7 are embodiments of methods for using simulcast in a distributed antenna system with a backfire configuration.

FIG. 6 is one embodiment of a method 600 for using simulcast in a DAS with a backfire configuration. The signal delay from a base station to a first antenna of a pair of antennas is calculated (610). Also, the signal delay from a base station to a second antenna of a pair of antennas is calculated (620). The second antenna will usually be the antenna with the shorter signal path. The signal from the base station to the second antenna of the pair of antennas is delayed such that the second signal (the "delayed signal") reaches the second antenna at least one chip delay after the first signal (the "signal") reaches the first antenna (630). With the set delays, the signals are simulcast from the pair of antennas (640).

The method 600 can be implemented for any number of antenna pairs. The method 600 can also be implemented for any number of antennas regardless of pairing of the antennas. The method 600 can be used with HSDPA and HSPA+ in a MIMO system. Also, the method 600 can be used with OFDMA using MIMO techniques such as STC or SM.

Figure 7:
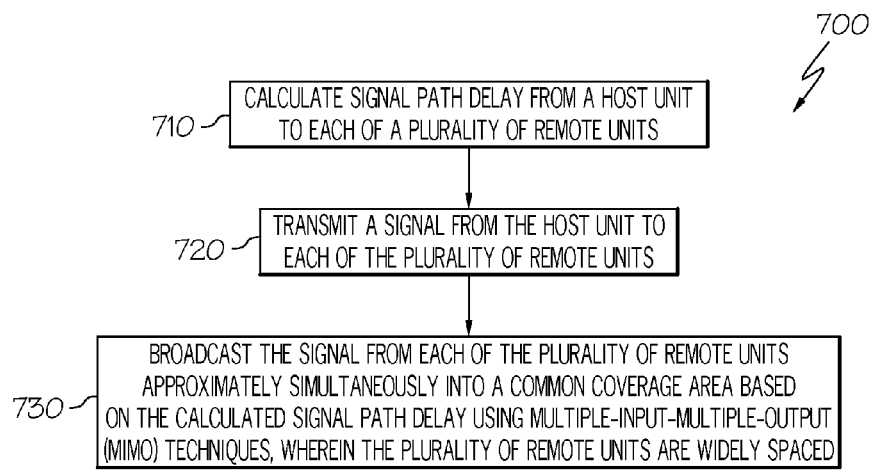

FIG. 7 is one embodiment of a method 700 for using simulcast in a DAS with a backfire configuration. The signal delay from the host unit to each of the plurality of remote units is calculated (710). A signal is transmitted from the host unit to each of the plurality of remote units (720). The signals are broadcasted from each of the plurality of remote units approximately simultaneously into a common coverage area based on the calculated signal path delays using MIMO techniques wherein the plurality of remote units is widely spaced (730). The method 700 can be implemented for any number of antennas or antenna pairs. The method 700 can be used with OFDMA using MIMO techniques such as STC or SM. When STC is used, the Alamouti method of channel coding using space-time block codes to transmit a copy of the signal to each remote unit can be used.

Figure 8A:
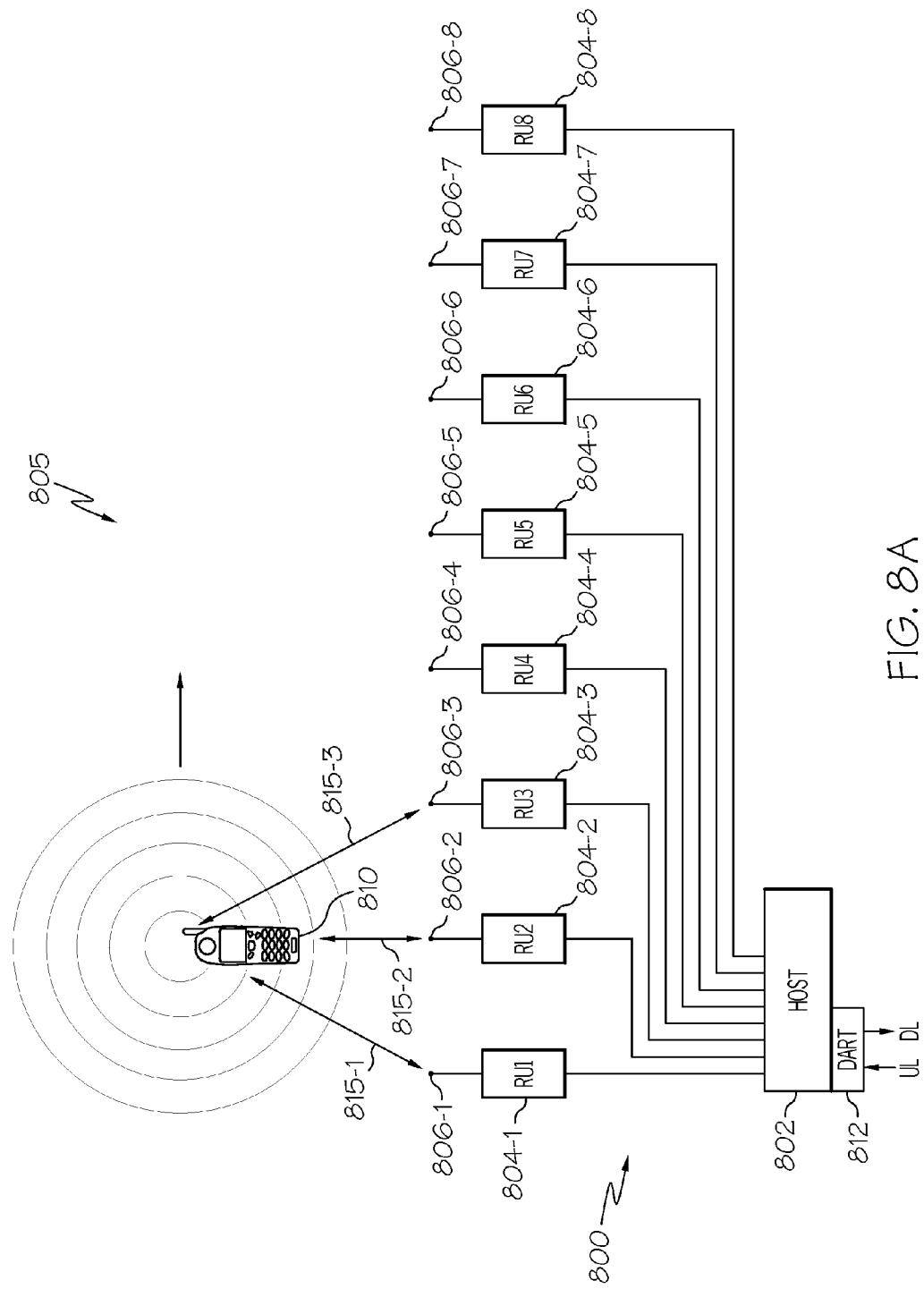
FIGS. 8A-8C are block diagrams of embodiments of a mobile device that has a rake receiver comprising three fingers within a coverage area of a backfire distributed antenna system.
Figure 8B:
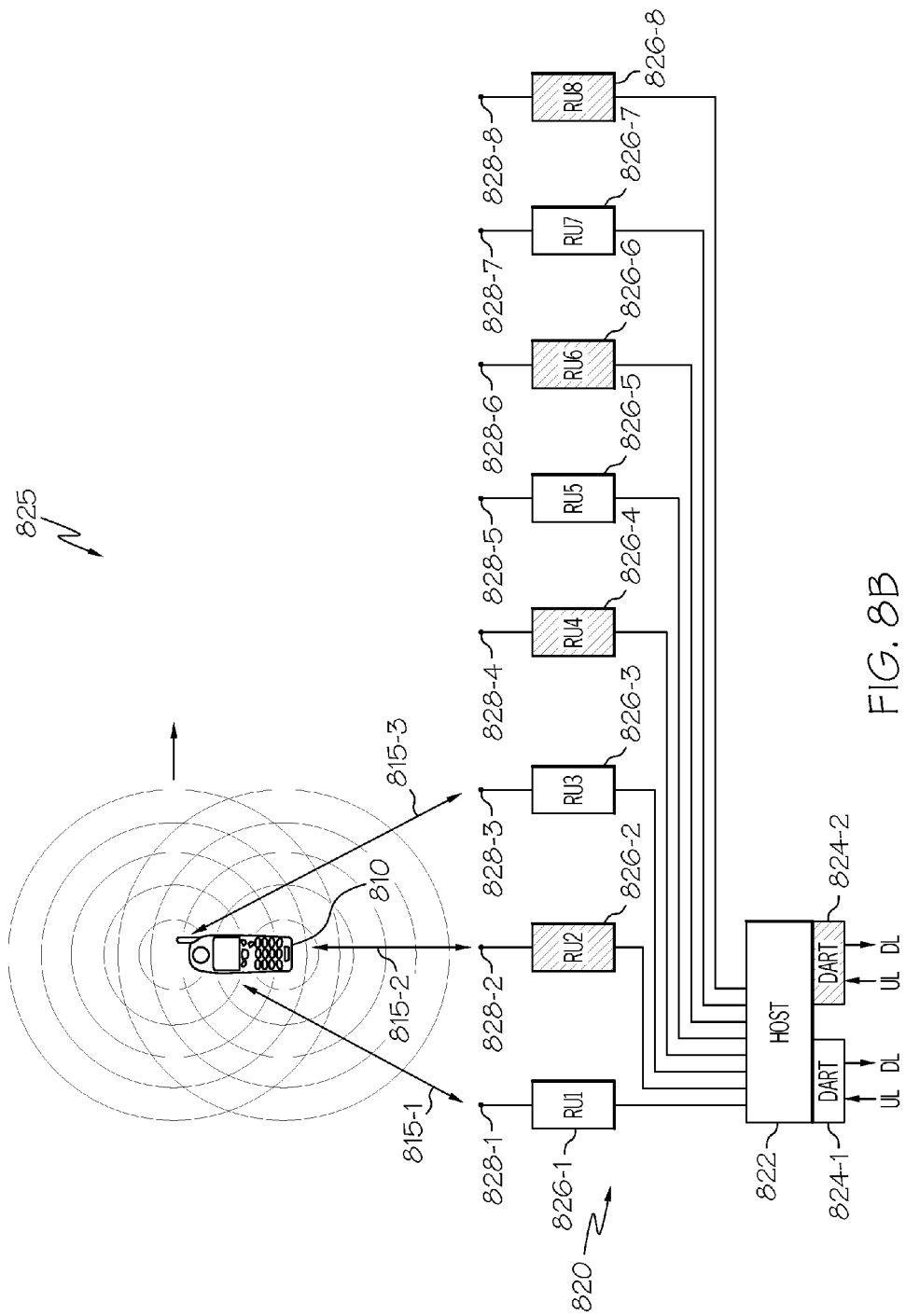
Figure 8C:
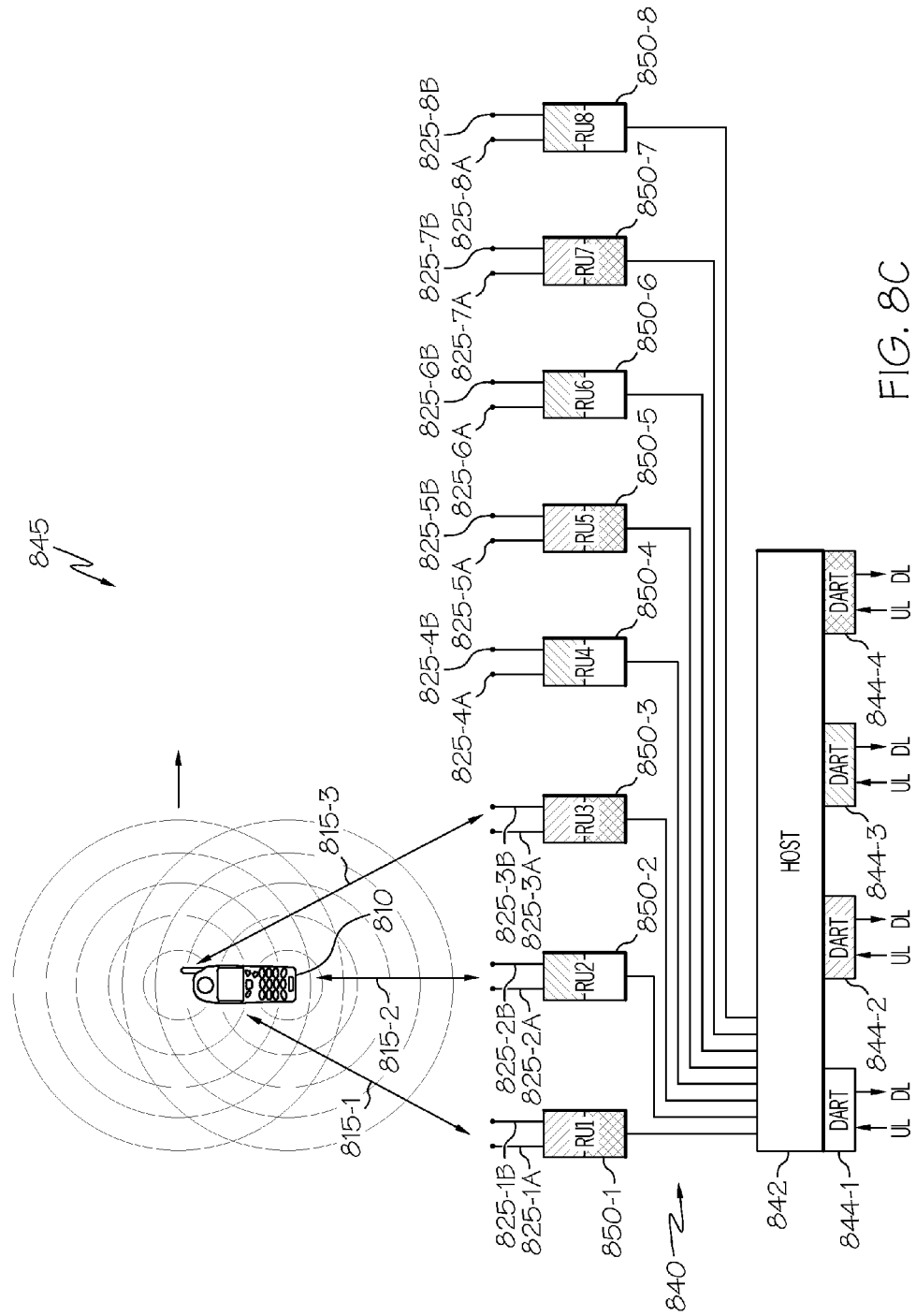

FIGS. 8A-8C are block diagrams of embodiments of a mobile device that has a rake receiver comprising three fingers within a coverage area of a backfire distributed antenna system. FIG. 8A depicts one embodiment of a mobile unit 810 within a coverage area 805 of a distributed antenna system 800. The DAS 800 can be an LTE system, a HSDPA system, or any other suitable distributed antenna system. The DAS 800 comprises a host 802 and eight remote units, 804-1 through 804-8 (collectively referred to herein as remote units 804). Each remote unit 804-1 through 804-8 has a corresponding antenna, 806-1 through 806-8, respectively (collectively referred to herein as antennas 806). The host 802 distributes a signal to each of the remote units 804, wherein each transceiver 806 transmits the signal at a time different from the transmission of the signal from each of the other antennas 804 by a least one chip. In other words, there is a delay of at least one chip between each signal transmitted by antennas 806.

Embodiments of the host unit 802 and the remote units 804 have a modular design and defined interfaces that allow components to be removed and installed to adapt to the needs of the service providers, as discussed in U.S. patent application Ser. No. 11/627,251 and incorporated herein by reference. Both host 802 and remote units 804 are designed around a serial radio frequency (SeRF) communicator and have a defined interface where different varieties of digital to analog radio frequency transceiver (DART) modules can be connected and disconnected. Shown in FIG. 8A, the host 802 comprises a DART module 812. There are many different embodiments of the DART module 812, and each DART module 812 is designed for a particular technology and frequency band. Thus, technology and frequency band adjustments can be made by simply replacing the DART module 812 in the host unit 802 or remote unit 804.

The mobile unit 810 comprises a rake receiver with three fingers, 815-1 through 815-3 (collectively referred to herein as fingers 815). Each finger 815 resolves a signal from one of the antennas 806. As depicted in FIG. 8A, finger 815-1 receives the signal from antenna 806-1, finger 815-2 receives the signal from antenna 806-2, and finger 815-3 receives the signal from antenna 806-3. Because each of the signals is delayed by at least one chip from each other, the mobile unit 810 can resolve the signals. The antennas 806 simulcast the signals into the coverage area 805.

As the mobile unit 810 moves through the coverage area 805, only three remote units 804 will be visible at any point. This is because the number of fingers 815 available in the rake receiver of the mobile unit 810 determines the number of signals the mobile unit 810 can differentiate between. In other words, the limiting factor of the number of replicas of the signal that can be received is the number of fingers of the rake receiver.

FIG. 8B depicts one embodiment of a mobile unit 810 within a coverage area 825 of a distributed antenna system 820 employing a two by two MIMO configuration. The mobile unit 810 comprises two transmitters and a rake receiver with at least three fingers, 815-1 through 815-3. A host 822 comprises two DART modules 824-1 and 824-2 that each are configured to send signals through the host 822 on the same frequency band. Remote units 826-1 through 826-8 are coupled to the host 822 and receive signals from the host 822. The host 822 sends the signal from the DART module 824-1 to remote units 826-1, 826-3, 826-5, and 826-7 and the signal from the DART module 824-2 to remote units 826-2, 826-4, 826-5, and 826-8.

The remote units 826-1 through 826-8 (referred to herein collectively as remote units 826) each comprise an antenna 828-1 through 828-8 (referred to herein collectively as antennas 828), respectively. The signals received at each remote unit 826 have a timing offset (that is, a delay) from the signals received at the other remote units 826. The antennas 828 simultaneously transmit the signals into the coverage area 825. As the mobile unit 810 moves through the coverage area 825, it receives two versions of the signal from one of the DART modules 824-1 or 824-2 and one signal from the other DART module 824-1 or 824-2. For the signal received twice, certain embodiments of the mobile unit 810 will not be able to use both versions of the same signal, and hence only one of the signals will be used (for example, the stronger signal).

Embodiments of the signals received at the remote units 826 are delayed from one another. In one embodiment, the signals to be transmitted from the remote units 826-1, 826-3, 826-5, and 826-7 are offset from each other in time by at least one chip. The signals to be transmitted from the remote units 826-2, 826-4, 826-5, and 826-8 are also offset from each other in time by at least one chip. However, the signals to be transmitted from, for example, remote unit 826-1 and remote unit 826-2 are not offset from one another because they are different signals. The mobile unit 810 is able to resolve those two signals without requiring a timing offset between them. The signals are all delayed (either digitally or using analog methods) such that the signals can be simulcast from their respective remote units 826.

FIG. 8C depicts one embodiment of a mobile unit 810 within a coverage area 845 of a distributed antenna system 840 employing a two by four MIMO configuration. The MIMO configuration is composed of four different signals leaving a host 842 (for example, received from a base station), and two different signals leaving the mobile unit 810. In this embodiment, the host 842 comprises four DART modules 844-1 through 844-4 that each provides a signal to the host 842. Remote units 850-1 through 850-8 (referred to collectively as remote units 850) are coupled to the host 842 and each comprise two antennas 852-1A and 852-1B through 852-8A and 852-8B, respectively. One embodiment of the antennas, for example 852-1A and 852-1B, are set apart in space such that they function as MIMO antennas and have polarization diversity between them. A timing offset exists between each of the remote units 850, created either through digital delay methods, analog delay methods, or a combination of both types of methods.

Each remote unit 850 receives two of the signals. For example, remote unit 850-1 receives signals from DART modules 844-1 and 844-2, and remote unit 850-2 receives signals from DART modules 844-3 and 844-4. Thus, each remote unit 850 transmits two different information streams on the same channel without any inherent difference in delay. However, the signals between different remote units 850 are offset from each other in the manner described above with respect to FIG. 8B and are simulcast from the antennas 852.

The mobile unit 810 receives as many signals as its rake receiver supports fingers 815. As depicted in FIG. 8C, the mobile unit 810 receives six different signals while it is within the coverage area 845. In other words, the mobile unit 810 receives four different MIMO signals, with two offset by significant distance and the other two offset by phase difference in the individual remote unit 850, and one set of those signals will be repeated from another remote unit 850 transmitting the same set of signals. Furthermore, because the signal path for finger 815-1 is different from 815-3, the mobile unit 810 will be able to resolve those signals when they are repeated. The mobile unit 810 resolves the signal through the polarization diversity of the signals radiated by the two antennas on each remote unit (such as antennas 852-1A and 852-1B on remote unit 850-1) and through physical spacing between two remote units that are transmitting the same signal (such as between remote unit 850-1 and remote unit 850-3).

In other embodiments of the DAS 840, adjacent remote units 850 receive the same set of signals. In one embodiment, each of the signals from the DART modules 844-1 thought 844-4 is transmitted over different frequency bands.

Figure 9:
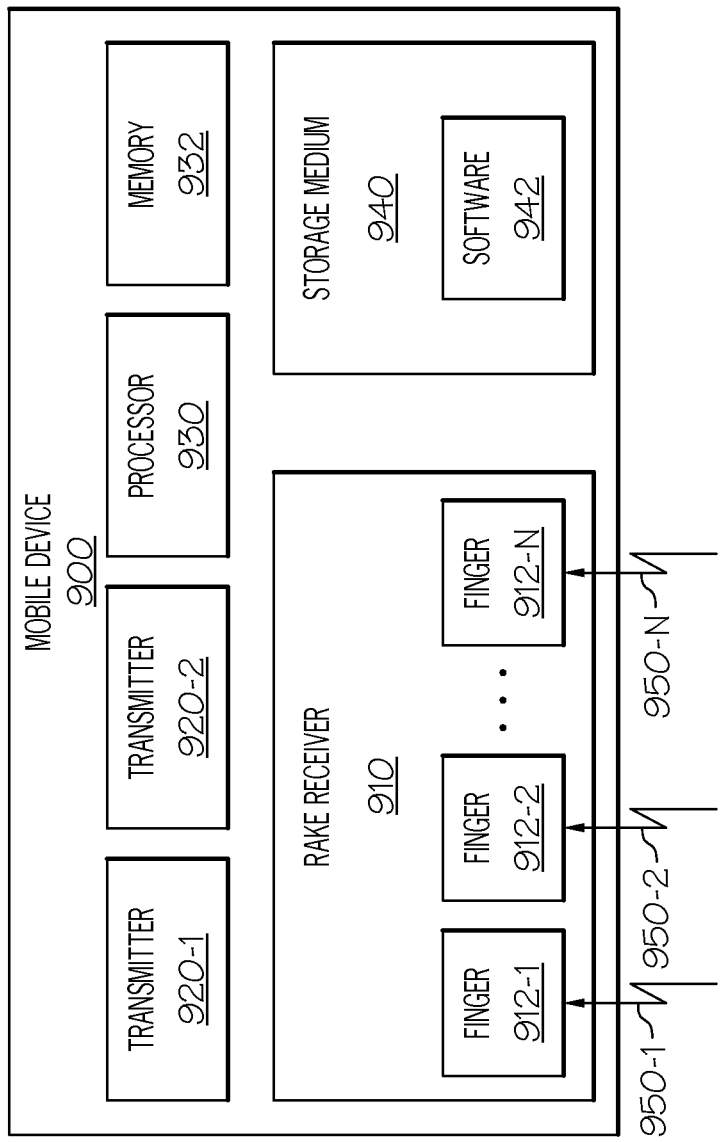
FIG. 9 is a block diagram of one embodiment of a mobile device.

FIG. 9 is a block diagram of one embodiment of a mobile device 900. The mobile device 900 comprises a rake receiver 910, at least two transmitters 920-1 and 920-2, a processor 930, a memory 932, and a storage medium 240. The rake receiver 910 comprises a plurality of fingers, 912-1 through 912-N (referred to herein collectively as fingers 912). The fingers 912 receive different signals, such as the MIMO signals described above with respect to FIG. 8C, and the mobile device 900 is able to resolve the signals through polarization diversity, spacing, and timing offsets. Software 942 comprises programmable instructions executable by the processor 930 which enable the mobile device 900 to resolve signals received by the fingers of the rake receiver 910. The at least two transmitters 920-1 and 920-2 enable the mobile unit 900 to downlink two sets of signals (for example, in the two by two MIMO configuration of FIG. 8B and the two by four MIMO configuration of FIG. 8C).

The rake receiver 901 receives a number of signals or sets of signals 950-1 through 950-N (referred to herein collectively as signals 950) equal to its number of fingers 912. The rake receiver 910 is able to resolve or combine these signals 950 into one or more coherent signals that can be used by other components of the mobile device 900 (for example, an audio signal could be resolved from the signals 950 and output to a user via a speaker). For example, the signals 950 could correspond to the signals received by the fingers 815 in FIGS. 8B and 8C.

Figure 10:
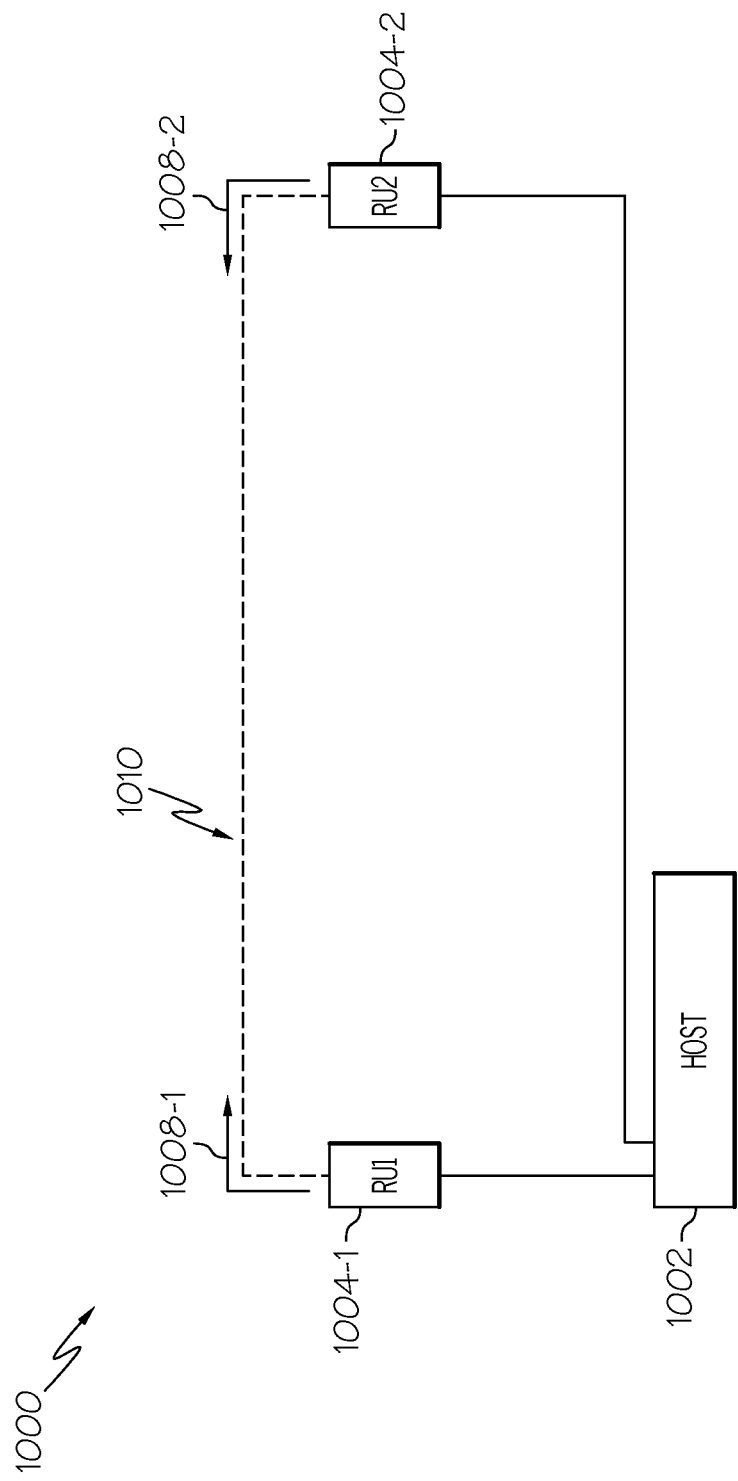
FIG. 10 is a block diagram of one embodiment of a backfire distributed antenna system using radiating cable.

The concepts described above can also be applied to distributed antenna systems utilizing radiating cable. FIG. 10 is a block diagram of one embodiment of a backfire distributed antenna system 1000 using radiating cable 1010. A host 1002 is communicatively coupled to a remote unit 1004-1 and a remote unit 1004-2. A signal is distributed to the remote unit 1004-1 and to the remote unit 1004-2. The signal received at the remote unit 1004-2 is delayed compared with a signal received at the remote unit 1004-1. The delay is achieved through either by a digital delay or an analog delay (for example, by adding additional length to the wiring connecting the host 1002 and the remote unit 1004-2).

A radiating cable 1010 has a first end coupled to the remote unit 1004-1 and a second end coupled to the remote unit 1004-2. The radiating cable 1010 comprises cabling that emits and receives electromagnetic radiation, typically at high frequency. One embodiment of the radiation cable 1010 comprises coaxial cable and uses a frequency range of approximately 3 to 30 MHz. However, other frequencies and cabling may be used, such as for example, 700-2600 MHz.

The signal from remote unit 1004-1 is sent along the forward path (represented by an arrow 1008-1) of the radiating cable 1010. The delayed signal from remote unit 1004-2 is sent along the reverse path (represented by an arrow 1008-2) of the radiating cable 1010. In other words, the same signal is simulcast on the radiating cable 1010 twice, one on the forward path 1008-1 and the other on the reverse path 1008-2, with a timing offset between the two instances of the signal. A rake receiver in proximity to the RC will receive both the forward 1008-1 and reverse path 1008-2.

The timing offset between the signal on the forward path 1008-1 (referred to herein as the forward signal) and the signal on the reverse path 1008-2 (referred to herein as the reverse signal) is at least one chip delay. This enables a rake receiver within the coverage area of the radiating cable to resolve both the forward signal and the reverse signal. In some embodiments, the timing offset between the forward signal and the reverse signal is greater than the time it takes the forward signal and reverse signal to reach their respective opposite end of the radiating cable 1010. A radiating cable will typically have areas along its length where the signal is faded (referred to as a fading dip). Sending a signal on the forward path and the reverse path of the radiating cable 1010 reduces the potential of dips forming in the signal. Because there are two signals, one delayed feed from each end of the radiating cable 1010, it is less likely that both signals will fade at the same time. A mobile unit within the coverage area of the radiating cable 1010 will be able to select the strongest signal path.

Embodiments of the DAS system 1000 install the radiating cable 1010 along an area that is more conducive to a radiating cable than antenna towers. For example, the radiating cable 1000 is installed along a tunnel (along, for example, a mass transit rail line or a highway tunnel), in a building (for example, along a hallway), or any other suitable location.

MIMO systems can also be used with radiating cable 1010. In such an embodiment, for example, two or more radiating cables are laid proximate to each other and define a common coverage area. Each of the radiating cables receives a different signal than the other radiating cables. The different signals may be, for example, a multiplexed version of a single signal. Other embodiments of the DAS 1000 comprise line amplifiers spaced at predetermined intervals along the radiating cable 1010 in order to boost the signals.

Several means are available to implement the systems and methods of the current invention as discussed in this specification. In addition to any means discussed above, for example, for processor 930, these means include, but are not limited to, digital computer systems, microprocessors, programmable controllers and field programmable gate arrays (FPGAs). Therefore other embodiments of the present invention are program instructions resident on computer readable media, such as storage medium 940, which when implemented by such controllers, enable the controllers to implement embodiments of the present invention. Computer readable media are physical devices which include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Distributed Antenna Systems in a backfire configuration provide increases in data speed for HSDPA and HSPA+. Greater isolation between cells is attained with less soft handovers occurring than with typical wireless systems because the signal throughout a cell is more consistent. Greater building penetration is achieved as well. The limited soft handover zones results in more capacity per cell. Shadowing effects are minimized. The remote units can be placed in any configuration, such as, but not limited to, approximately curvilinear, rectangular, square, diamond, hexagonal, toroidal, and circular. DAS widely spaced backfire MIMO with STC or SM increases network performance, providing higher average data rates, better voice quality, longer battery life, and fewer soft handovers between cells.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A distributed antenna system (DAS), comprising:
   a host unit; and
   a plurality of remote units wherein the plurality of remote units are paired, wherein a pair of remote units are placed to define a common coverage area and each remote unit in a pair of remote units:
      is communicatively coupled to the host unit;
      points at least partially towards the remote unit to which it is paired, wherein each remote unit in the pair of remote units is spaced from the remote unit to which it is paired such that near each remote unit in the pair of remote units, a signal from the remote unit to which it is paired is negligible and the signal strength through the common coverage area is approximately constant, wherein the common coverage area is isolated from adjacent common coverage areas; and
      simulcasts data from the host unit on the same frequency band as the remote unit to which it is paired.

2. The system of claim 1, wherein the host unit further comprises:
   a processing unit operable to:
      calculate a first delay of a signal path from the host unit to a first remote unit of each pair of remote units;
      calculate a second delay of a signal path from the host unit to a second remote unit of each pair of remote units;
      delay the signal from the host unit to the second remote unit such that the delayed signal arrives at the second remote unit at least one chip transmission time after the signal arrives at the first remote unit; and
      broadcast the signal and the delayed signal approximately simultaneously; and
   a memory coupled to the processing unit.

3. The system of claim 2, wherein the timing of the delayed version of the signal is sufficient such that a rake receiver in a mobile unit can resolve the signal and the delayed version of the signal.

4. The system of claim 1, wherein the pair of remote units point inward to the common coverage area.

5. The system of claim 1, wherein the host unit further comprises:
   a network interface to communicatively couple with a base station transceiver.

6. The system of claim 1, wherein the plurality of remote units operate on the same frequency band.

7. The system of claim 1, wherein each remote unit pair is on a frequency band distinct from that of the other remote unit pairs.

8. The system of claim 1, wherein simulcast data from the host unit further comprises:
   a first remote unit transmitting a signal with delay X; and
   a second remote unit transmitting the signal with delay X+Y, where Y is greater than the transmission time for a single chip.

9. The system of claim 1, wherein the remote units are placed in a shape selected from the group consisting of approximately curvilinear, rectangular, square, diamond, hexagonal, octagonal, toroidal, and circular.

10. The system of claim 1, wherein the DAS is providing high-speed downlink packet access (HSDPA) to the coverage area.

11. The system of claim 1, wherein the DAS uses Space Time Coding (STC).

12. The system of claim 1, wherein the DAS uses Spatial Multiplexing (SM).

13. The system of claim 1, wherein the plurality of remote units comprises four remote units wherein the remote units are placed around the periphery of a building.

14. The system of claim 1, wherein the host is communicatively coupled to the base station transceiver using a transport medium selected from the group consisting of coaxial cable, fiber optic connections, twisted pair, free space optics, cable, mmWave, and radio frequency (RF) links.

15. The system of claim 1, wherein the plurality of antennas are communicatively coupled to the host using a transport medium selected from the group consisting of coaxial cable, fiber optic connections, twisted pair, free space optics, cable, mmWave, and radio frequency (RF) links.

16. A method for transmitting signals in a common coverage area, the method comprising:
   calculating a first delay of a signal path from a host unit to a first remote unit of a pair of remote units, wherein the pair of remote units are placed to define a common coverage area;
   calculating a second delay of a signal path from the host unit to a second remote unit of the pair of remote units, wherein the second remote unit is spaced from the first remote unit such that near the first remote unit the signal from the second remote unit is negligible and near the second remote unit the signal from the first remote unit is negligible, and a signal strength through the common coverage area is approximately constant, wherein the common coverage area is isolated from adjacent common coverage areas;
   delaying the signal from the host unit to the second remote unit such that the delayed signal arrives at the second remote unit at least one chip transmission time after the signal arrives at the first remote unit; and
   broadcasting the signal and the delayed signal approximately simultaneously.

17. The method of claim 16, wherein broadcasting the signal and the delayed signal further comprises broadcasting them over a common frequency band.

18. The method of claim 16, wherein broadcasting the signal and the delayed signal approximately simultaneously further comprises using Space Time Coding (STC).

19. The method of claim 16, wherein broadcasting the signal and the delayed signal approximately simultaneously further comprises using Spatial Multiplexing (SM).

20. A computer program product, comprising:
   a non-transitory computer readable medium having instructions stored thereon for a method of transmitting signals in a common coverage area, the method comprising:
      calculating a first delay of a signal path from a host unit to a first remote unit of a pair of remote units, wherein the pair of remote units are placed to define a common coverage area;
      calculating a second delay of a signal path from the host unit to a second remote unit of a pair of remote units, wherein the second remote unit is spaced from the first remote unit such that near the first remote unit the signal from the second remote unit is negligible and near the second remote unit the signal from the first remote unit is negligible, and a signal strength through the common coverage area is approximately constant, wherein the common coverage area is isolated from adjacent common coverage areas;
      delaying the signal from the host unit to the second remote unit such that the delayed signal arrives at the second remote unit at least one chip transmission time after the signal arrives at the first remote unit; and broadcasting the signal and the delayed signal approximately simultaneously.

21. The computer program product of claim 20, wherein broadcasting the signal and the delayed signal further comprises broadcasting them over a common frequency band.

22. The computer program product of claim 20, wherein broadcasting the signal and the delayed signal approximately simultaneously further comprises using Space Time Coding (STC).

23. The computer program product of claim 20, wherein broadcasting the signal and the delayed signal approximately simultaneously further comprises using Spatial Multiplexing (SM).

24. A distributed antenna system (DAS), comprising:
a host unit; and
a plurality of remote units coupled to the host unit, the plurality of remote units placed to define a common coverage area wherein the plurality of remote units:
point at least partially inwards towards the common coverage area, wherein the common coverage area formed by the plurality of remote units is isolated from adjacent coverage areas formed by remote units in the DAS;
are widely spaced from each other such that near each remote unit in the plurality of remote units, signals from other remote units in the plurality of remote units are negligible, wherein the signal strength within the common coverage area is approximately constant; and
are paired to use multiple-input, multiple-output (MIMO) techniques.

25. The system of claim 24, wherein the host unit is configured to distribute orthogonal frequency division multiple access (OFDMA) signals.

26. The system of claim 24, wherein the MIMO network uses space time coding (STC).

27. The system of claim 26, wherein using space time coding further comprises the Alamouti method of channel coding using space-time block codes to transmit a copy of the signal to each remote unit.

28. The system of claim 24, wherein the MIMO network uses spatial multiplexing (SM).

29. The system of claim 24, wherein the plurality of remote units further comprises pairing a first remote unit with a second remote unit wherein each pair of remote units broadcasts on a common frequency band.

30. A method for transmitting signals in a coverage area, the method comprising:
calculating signal path delay from a host unit to each of a plurality of remote units;
transmitting a signal from the host unit to each of the plurality of remote units;
broadcasting the signal from each of the plurality of remote units approximately simultaneously into a common coverage area based on the calculated signal path delays using multiple-input-multiple-output (MIMO) techniques, wherein the plurality of remote units is widely spaced from each other such that near each remote unit in the plurality of remote units, signals from other remote units in the plurality of remote units are negligible and the common coverage area is isolated from adjacent coverage areas formed by remote units coupled to the host unit, wherein the signal strength within the common coverage area is approximately constant.

31. The method of claim 30, broadcasting a signal further comprises using orthogonal frequency division multiple access (OFDMA).

32. The method of claim 30, broadcasting the signal further comprises using space time coding (STC).

33. The network of claim 32, wherein using space time coding further comprises the Alamouti method of channel coding using space-time block codes to transmit a copy of the signal to each remote unit.

34. The network of claim 30, broadcasting the signal further comprises using spatial multiplexing (SM).

35. A distributed antenna system (DAS), comprising:
a host unit; and
a plurality of remote units wherein each of the plurality of remote units:
is communicatively coupled to the host unit;
points at least partially towards a common coverage area such that the common coverage area is isolated from adjacent coverage areas, wherein the signal strength within the common coverage area is approximately constant; and
simulcasts data from the host unit.

36. The system of claim 35, wherein simulcasts data from the host unit further comprises at least a first remote unit simulcasts on the same frequency band as a second remote unit.

37. The system of claim 35, wherein simulcasts data from the host unit further comprises wherein each of the plurality of remote units receives the data with a timing offset different from the data received by each other of the plurality of remote units; and
wherein the timing offset between the data received by each remote unit is at least one chip apart from the data received by every other remote unit.

38. The system of claim 37, wherein the timing offset is achieved by one of a digital delay, an analog delay, or combinations thereof.

39. The system of claim 35, wherein the host unit further comprises:
a processing unit operable to:
calculate a first delay of a signal path from the host unit to a first remote unit of the plurality of remote units;
calculate a second delay of a signal path from the host unit to a second remote unit of the plurality of remote units;
delay the signal from the host unit to the second remote unit such that the delayed signal arrives at the second remote unit at least one chip transmission time after the signal arrives at the first remote unit; and
broadcast the signal and the delayed signal approximately simultaneously; and
a memory coupled to the processing unit.

40. The system of claim 39, wherein the timing of the delayed version of the signal is sufficient such that a rake receiver in a mobile unit can resolve the signal and the delayed version of the signal.

41. The system of claim 35, wherein the plurality of remote units operate on the same frequency band.

42. The system of claim 35, wherein each remote unit pair is on a frequency band distinct from that of the other remote unit pairs.

43. The system of claim 35, wherein the DAS is providing high-speed downlink packet access (HSDPA) to the coverage area.

44. The system of claim 35, wherein the DAS uses one of space time coding (STC) and spatial multiplexing (SM).

45. A method for transmitting signals in a common coverage area, the method comprising:

calculating a first delay of a signal path from a host unit to a first remote unit of a plurality of remote units, wherein the plurality of remote units are placed to define a common coverage area;

calculating a second delay of a signal path from the host unit to a second remote unit of the plurality of remote units, wherein the second remote unit is spaced from the first remote unit such that near the first remote unit the signal from the second remote unit is negligible and near the second remote unit the signal from the first remote unit is negligible, and a signal strength through the common coverage area is approximately constant, wherein the common coverage area is isolated from adjacent common coverage areas;

delaying the signal from the host unit to the second remote unit such that the delayed signal arrives at the second remote unit at least one chip transmission time after the signal arrives at the first remote unit; and broadcasting the signal and the delayed signal approximately simultaneously.

46. The method of claim 45, wherein broadcasting the signal and the delayed signal further comprises broadcasting them over a common frequency band.

47. The method of claim 45, wherein broadcasting the signal and the delayed signal approximately simultaneously further comprises using one of space time coding (STC) and spatial multiplexing (SM).

48. A distributed antenna system (DAS), comprising:
a host unit, wherein the host unit provides a data signal to a first remote unit and a second remote unit;
a radiating cable, wherein:
a first end of the radiating cable is coupled to the first remote unit and a second end of the radiating cable is coupled to the second remote unit to define a common coverage area;
the first remote unit sends the data signal on a forward path of the radiating cable; and
the second remote unit sends a delayed data signal on a reverse path of the radiating cable, wherein the delayed data signal is the data signal with a timing offset,
wherein the second remote unit is spaced from the first remote unit such that near the first remote unit the signal from the second remote unit is negligible and near the second remote unit the signal from the first remote unit is negligible, and a signal strength through the common coverage area is approximately constant, wherein the common coverage area is isolated from adjacent common coverage areas.

49. The DAS of claim 48, wherein the timing offset is at least one chip.

50. The DAS of claim 48, wherein the radiating cable is installed in one of a tunnel, a building, and a mass transit rail line.

51. The DAS of claim 48, further comprising:
a second radiating cable; and
wherein the first radiating cable radiates a first component of a spatially multiplexed data signal and second radiating cable radiates a second component of the spatial multiplexed data signal.

52. A program product for transmitting signals in a common coverage area, the program-product comprising a non-transitory processor-readable medium on which program instructions are embodied, wherein the program instructions are operable, when executed by at least one programmable processor included in a host unit, to cause the host unit to:

calculate a first delay of a signal path from a host unit to a first remote unit of a plurality of remote units, wherein the plurality of remote units are placed to define a common coverage area;

calculate a second delay of a signal path from the host unit to a second remote unit of a plurality of remote units, wherein the second remote unit is spaced from the first remote unit such that near the first remote unit the signal from the second remote unit is negligible and near the second remote unit the signal from the first remote unit is negligible, and a signal strength through the common coverage area is approximately constant, wherein the common coverage area is isolated from adjacent common coverage areas;

delay the signal from the host unit to the second remote unit such that the delayed signal arrives at the second remote unit at least one chip transmission time after the signal arrives at the first remote unit; and broadcast the signal and the delayed signal approximately simultaneously.

53. The computer program product of claim 52, wherein broadcast the signal and the delayed signal further comprises broadcasting the signal and the delayed signal over a common frequency band.

54. The computer program product of claim 52, wherein broadcasting the signal and the delayed signal approximately simultaneously further comprises using Space Time Coding (STC).

55. The computer program product of claim 52, wherein broadcasting the signal and the delayed signal approximately simultaneously further comprises using Spatial Multiplexing (SM).

56. A mobile device, comprising:
at least one transmitter; and
a rake receiver, wherein the rake receiver comprises a plurality of fingers, wherein the plurality of fingers resolves a first data signal from a second data signal, wherein the first and second data signals are received within a common coverage area of a backfire distributed antenna system, wherein the coverage area is isolated from adjacent coverage areas in the backfire distributed antenna system and the signal strength through the common coverage area is approximately constant.

57. The mobile device of claim 56, wherein the first data signal and the second data signal comprise the same signal with a timing offset of at least one chip.

58. The mobile device of claim 56, wherein the first and second data signals are within a first frequency band and have polarization diversity.

59. The mobile device of claim 56, wherein the backfire distributed antenna system comprises a plurality of base stations operating in a simulcast mode.

60. A distributed antenna system, comprising:
a host unit configured to simulcast at least one data signal; and
a plurality of remote units coupled to the host unit, wherein the plurality of remote units define a plurality of coverage areas wherein the plurality of coverage areas are isolated from one another, wherein:
each of the plurality of remote units comprises at least one antenna;
a first set of the plurality of remote units receives a first data signal; and
a second set of the plurality of remote units receives a second data signal;
wherein the first and second data signals are broadcasted approximately simultaneously from the at least one antenna of each of the plurality of remote units to form a common coverage area in the plurality of coverage areas;

wherein each of the plurality of remote units comprises a first antenna and a second antenna spaced apart to employ multiple-input-multiple-output functionality;

wherein the first set of the plurality of remote units receives a third data signal, wherein the first data signal is transmitted by the first antenna of each remote unit in the first set of the plurality of remote units and the third data signal is transmitted by the second antenna of each remote unit in the first set of the plurality of remote units; and wherein the second set of the plurality of remote units receives a fourth data signal, wherein the second data signal is transmitted by the first antenna of each remote unit in the second set of the plurality of remote units and the fourth data signal is transmitted by the second antenna of each remote unit in the second set of the plurality of remote units.

61. The distributed antenna system of claim 60, further comprising:

a plurality of digital to analog radio frequency transceiver (DART) modules coupled to the host unit, wherein each DART module provides a signal to the host unit on a distinct channel.

62. The distributed antenna system of claim 60, further comprising:

wherein the first data signal is broadcasted approximately simultaneously from each of the remote units in the first set of the plurality of remote units; and wherein the second data signal is broadcasted approximately simultaneously from each of the remote units in the second set of the plurality of remote units.

63. The distributed antenna system of claim 60, further comprising:

wherein the first data signal is broadcasted from each of the remote units in the first set of the plurality of remote units with a first timing offset; and wherein the second data signal is broadcasted from each of the remote units in the second set of the plurality of remote units with a second timing offset.

64. The distributed antenna system of claim 60, wherein a remote unit from the second set of the plurality of remote units is located between a first remote unit from the first set of the plurality of remote units and a second remote unit from the first set of the plurality of remote units.

* * * * *